United States Patent

Gillispie et al.

[11] Patent Number: 5,828,452
[45] Date of Patent: Oct. 27, 1998

[54] SPECTROSCOPIC SYSTEM WITH A SINGLE CONVERTER AND METHOD FOR REMOVING OVERLAP IN TIME OF DETECTED EMISSIONS

[75] Inventors: Gregory Gillispie; Jimmie A. Burt, both of Fargo, N. Dak.

[73] Assignees: Dakota Technologies, Inc.; NDSU Research Foundation, both of Fargo, N. Dak.

[21] Appl. No.: 777,903

[22] Filed: Dec. 31, 1996

[51] Int. Cl.[6] .............................. G01J 3/32; G01N 21/64
[52] U.S. Cl. ........................ 356/328; 356/318; 356/334
[58] Field of Search .................................. 356/328, 334, 356/318

[56] References Cited

U.S. PATENT DOCUMENTS

| | | | |
|---|---|---|---|
| 4,164,373 | 8/1979 | Schuss et al. | 356/328 X |
| 5,379,103 | 1/1995 | Zigler | 356/318 X |
| 5,483,546 | 1/1996 | Johnson et al. | 356/318 X |
| 5,498,875 | 3/1996 | Obremski et al. | 356/318 X |

OTHER PUBLICATIONS

Poster Board Presentation re: Total Emission Detection, presented at the Minnesota Chromatography Forum, 19 pages (May 1995).
"Five–Channel Polychromator Head", *NASA Tech Briefs*, Physical Sciences, p. 52, second page unnumbered (Oct. 1995).
"SPC–300 —PC Module for Time–Correlated Single Photon Counting", Product Brochure by Becker & Hickl GmbH and BiosQuanT GmbH, pp. 1–13 (Publication date prior to filing of present application).
"SPC–300 —Time–Correlated Single Photon Counting Module", Product Brochure by Becker & Hickl GmbH and BiosQuant GmbH, 3 pages (Publication Date prior to filing of present application).

Cobble, J.A., et al., "Simultaneous temporal, spectral, and spatial resolution of laser scatter from parametric plasma instabilities", *Rev. Sci. Instrum.*, 66, American Institute of Physics, pp. 4204–4207 Aug. 1995.

Panne, U., et al., "A fiber–optical sensor for polynuclear aromatic hydrocarbons based on multidimensional fluorescence", *Sensors and Actuators B*, 13–14, pp. 288–292 (1993).

Rentzepis, P.M., "Picosecond Chemical and Biological Events", *Science*, vol. 202, pp. 174–182 (Oct. 13, 1978).

Theriault, G.A., et al., "Fiber optic fluorometer based on a dual wavelength laser excitation source", *Chemical, Biochemical, and Environmental Fiber Sensors IV*, Paper presented at OE/Fibers in Boston, MA, 9 pages (Sep. 1992).

*Primary Examiner*—Vincent P. McGraw
*Attorney, Agent, or Firm*—Schwegman, Lundberg, Woessner & Kluth, P.A.

[57] ABSTRACT

A spectroscopic system that processes spatially dispersed electromagnetic emissions at a number of wavelengths from a test material. The spectroscopic system includes a converter that generates an electrical signal that is proportional to the intensity of electromagnetic radiation received by the converter. An optical delay circuit is coupled to an input of the converter. The optical delay circuit selectively delays application to the converter of electromagnetic emissions from the test material for at least one wavelength of electromagnetic emissions. A data processing circuit is coupled to an output of the converter. The data processing circuit records the value of the electrical signal from the converter over time so as to measure, contemporaneously, the intensity of electromagnetic emissions at each wavelength as a function of time.

17 Claims, 20 Drawing Sheets

SPECTROSCOPIC SYSTEM WITH A SINGLE CONVERTER AND METHOD FOR REMOVING OVERLAP IN TIME OF DETECTED EMISSIONS

GOVERNMENT LICENSE RIGHTS

The United States Government has a paid-up license in this invention and the right in limited circumstances to require the patent owner to license others on reasonable terms as provided for by the terms of contract No. F08637 95 C6008 awarded by the United States Air Force.

TECHNICAL FIELD OF THE INVENTION

The present invention relates generally to spectroscopy and, in particular, to a spectroscopic system and method.

BACKGROUND OF THE INVENTION

Spectroscopy provides a minimally invasive approach for identification of sample materials and rapid chemical analysis. Spectroscopic methods can be used for either qualitative or quantitative analysis purposes. Two major forms of spectroscopy are absorbance spectroscopy and emission, or luminescence, spectroscopy. It is noted that the terms emission and luminescence are used interchangeably throughout this specification. Absorbance spectroscopy is the quantitative study of light absorbed by a test material. Emission spectroscopy is the quantitative study of light given off by a test material. The wavelengths of light that are absorbed by a test material or are emitted from the test material are diagnostic of the test material's chemical composition. The intensities of the absorbed or emitted light depend on the amounts or concentrations of the chemical species in the test material.

For emission spectroscopy, there are numerous ways to energize a test material to create light emission. For example, a convenient way to cause test materials to emit light is to irradiate them at wavelengths for which photons are absorbed. This excitation process is referred to as photoexcitation. Alternatively, some materials glow by incandescence and thermoluminescence when heated to sufficiently high temperature. Chemiluminescence is the light emission from excited molecules created by chemical reaction. Chemiluminescence that occurs in living things, for example, fireflies, is referred to as bioluminescence. Light emission which is generated by subjecting the material to a mechanical stress is referred to as triboluminescence. A form of spectroscopy known as inductively coupled plasma-optical emission spectroscopy (ICP-OES) uses radio frequency energy, which simultaneously breaks apart molecules and electronically excites the atoms and monoatomic ions created by the fragmentation process.

Emission spectroscopy methods are widely applied in medical diagnostics, clinical chemistry, environmental analysis and other fields. The medical field, for example, uses emission spectroscopy to distinguish abnormal or cancerous tissue from normal tissue on the basis of their differing fluorescence spectra. In the environmental arena, spectroscopic devices can be used to identify the sources and nature of contamination and to determine the direction of its movement and its distribution in air, soil, and groundwater. For example, fluorescence has been used to detect and characterize spilled or leaked petroleum products such as gasoline, jet fuel, and diesel fuel.

The photoexcitation approach has several advantages over other excitation processes for generating light emission. Photoluminescence is a sequence of separate light absorbance and light emission events. For every photon that is absorbed, one molecule in the sample undergoes a transition from a lower energy state to a higher energy state. For every photon that is emitted, one molecule undergoes a transition from a higher energy state to a lower energy state. The energy of the photon that is absorbed (emitted) is equal to the energy increase (decrease) that the molecule experiences. Each molecule has its own characteristic absorbance and emission spectra. Photoluminescence methods therefore provide specificity because the emitted light intensity of a measurement is sensitive to the choice of both the excitation and emission wavelengths. Photoluminescence is also versatile because molecules can be excited at a number of different excitation wavelengths.

The main components of a conventional luminescence instrument, usually referred to as a spectrofluorimeter or spectrofluorometer, are the excitation light source, the sample chamber, the emission wavelength analyzer, the detector, and the data recording system. A xenon arc lamp is a popular choice for the excitation light source. Because the output of the xenon lamp covers a wide wavelength range, a wavelength-selective filter is generally used to provide a relative narrow wavelength range for excitation purposes.

In some applications it may be preferable to use a laser as the excitation source. The potential advantages of laser excitation sources are several. The laser inherently provides spectrally narrow (monochromatic) light output. In addition, the high intensity of the laser induces more intense emission light signals than do conventional light sources. If the source is pulsed, as are most ultraviolet lasers, time-resolved emission spectra can be collected. Lasers are also convenient for launching light into fiber optics for purposes of remote luminescence measurements.

Commercial spectrofluorimeters can typically be operated in separate emission and excitation spectrum data collection modes. In the emission mode, the intensity of the emitted light is detected and recorded as a function of the emission wavelength while the excitation wavelength is held fixed. A graph of the emitted light intensity vs. emission wavelength is referred to as an emission spectrum. For purposes of this specification, the term emission spectrum means the relative intensity distribution of emitted light at a plurality of wavelengths. Luminescence excitation spectra are measured in analogous fashion to the emission spectra; the emission intensity is monitored at a fixed wavelength while the excitation wavelength is varied over the range of interest.

There are two main methods to convert the light signal into an electrical signal for purposes of recording an emission spectrum. In the scanning mode, a representative portion of the light emitted from the sample is directed into a monochromator, which acts as a variable wavelength filter. Of the light entering the monochromator, only that proportion which lies within a narrow wavelength range, selected by the orientation of a dispersive prism or grating located interior to the monochromator, is passed to a detector located at the exit side of the monochromator. The detector, which could be a photomultiplier tube, photodiode, or similar device, quantitatively records the intensity of the light passed by the monochromator by converting the light into an electrical signal. The monochromator then is scanned or stepped to another narrow wavelength range, data collected, and the process repeated until the entire spectral range of interest has been studied.

The scanning mode may not be fast enough for certain applications, in particular, for applications in which the composition of the sample material changes rapidly. For example, the sample may undergo a chemical reaction, possibly one induced by the excitation light itself. Or the sample may be a process stream of variable composition that is flowing through the measurement chamber of the luminescence instrument. A variation on the theme of rapidly changing samples is represented by recently developed techniques in which the excitation light is delivered via a fiber optic probe, which is pushed through the sample or moved across the surface of the sample. The emission can be collected with the same or a different fiber optic, which returns a portion of the emitted light to the detection system.

The array detector mode relies on photodiode arrays (PDA) or charge-coupled device (CCD) cameras, which are capable of measuring a complete emission spectrum in a short period of time. These devices consist of an array of independent detectors such that each detector element simultaneously accumulates a light signal in a different wavelength range. The array detectors are generally mated with a spectrograph, which functions to spatially resolve the emitted light as a function of wavelength.

Similar to the situation for collection of wavelength dependent spectra, temporal "waveforms" or "decay profiles" can be collected either by scanning a time gate or by direct capture of the entire waveform. The temporal scanning mode, often referred to as a boxcar mode, uses a time gate to control which portion of the detector electrical signal is actually recorded. The gate acts as a fast time switch. The gate is scanned by moving its position in time relative to the excitation pulse. Alternatively, the entire waveform can be recorded for a single excitation pulse with an oscilloscope, a transient digitizer, or a streak camera. There is a third method, known as time-correlated single photon counting (TC-SPC), to collect temporal data and determine lifetimes, but it requires a very high repetition rate excitation source if the data are to be collected in a reasonable amount of time. The TC-SPC method yields a histogram of time intervals between the excitation of the sample and the first detection of an emitted photon.

A method has been recently developed for assessing petroleum contamination in soil by fiber optic fluorescence technology. Excitation light from a spectrofluorimeter is coupled by an optical fiber to a windowed probe that can be continuously pushed into the ground to a depth of 100 feet or more by adding lengths of pipe. The excitation light is delivered via fiber optic to the window which is made of sapphire or some similarly hard material. If there are any petroleum products present in the soil immediately outside the window, a fluorescence signal is induced by the exciting light and a portion of the fluorescence light is returned via fiber optics to the spectrofluorimeter in the manner described above. Because the intensity of the fluorescence signals are related to the amount of petroleum contamination in the soil, one can construct a three dimensional map of the soil contamination by recording the surface position (x,y) and the depth (z) for each instance of contaminant detected. When combined with soil stratigraphy and water flow information, these data can indicate probable flow rates and paths.

One wishes to obtain as much information as possible by spectral and/or temporal analysis of the return fluorescence signal. Petroleum products, and many other substances that can be studied by photoluminescence methods, may and generally do contain many different compounds that are mixed together and are capable of independently emitting light. Ideally, the emission spectrum of a mixture is the sum of the emission spectra of its constituents. Thus, it should be possible to decompose the total emission spectrum into a linear combination of known spectra of individual components. Unfortunately, the component spectra are often so similar that the spectral decomposition cannot be made on the basis of the emission spectrum or the excitation spectrum alone. Similarly, approaches that yield only temporal data are limited in their ability to analyze a mixture. As with spectral data, the decay profile of a mixture is ideally the sum of the decay profiles of the constituents. However, similar compounds have decay profiles that are not sufficiently different to allow accurate determinations based solely on temporal data. Further, the lifetime of a compound is affected by its environment. For example, the lifetime of naphthalene in gasoline can be different from its lifetime in jet fuel. Hence, the temporal data are affected by the compound and its environment.

An improved mathematical decomposition of the spectral and temporal data is possible if multi-dimensional data are collected and analyzed. For condensed phase (i.e., solid or liquid) samples that contain only one emitting species, the shape of the emission spectrum is independent of the excitation source intensity and excitation wavelength. Variation of the emission spectral distribution with excitation wavelength is indicative of a multi-component sample. The emission intensity of a mixture of chemical components can be written as a sum of triple products each multiplied by a term related to the contribution of the chemical component to the total signal. For purposes of determining these weighting factors, it is convenient to acquire and process multi-dimensional data arrays. Types of multi-dimensional data modes for luminescence measurements are now described.

A series of emission spectra acquired at different excitation wavelengths, or the equivalent, a series of excitation spectra acquired at a series of emission monitoring wavelengths, is referred to as an excitation-emission matrix (EEM). Multiple dimension data modes involving time and one of the two wavelength dimensions have been developed. These are referred to as wavelength-time matrices (WTMs) or similar terms. They can be analyzed by chemometric methods similar in many ways to the methods used to analyze EEMs. WTMs have certain advantages over EEMs for chemometric analysis because the temporal waveform can be mathematically represented a convolution of the excitation temporal profile with a function which contains only one parameter, the lifetime. Analyses can be performed more easily without the need for extensive databases of reference spectra.

An instrument that outputs EEMs or WTMs should operate in the shortest possible time. The routine approach to EEMs requires operation of both the excitation and emission monochromators in scan mode. The excitation monochromator is stepped through M different wavelengths while the emission spectrum is stepped through N different wavelengths for each excitation wavelength. Thus, a total of M×N wavelength settings and measurements must be performed. If the scanning emission monochromator with single channel detector is replaced by a spectrograph with an array detector, then only M measurements must be performed and there is a considerable time savings. Another benefit is that certain sources of noise in the data are eliminated by collected the data in one of the spectral dimensions all at once.

Even more desirable would be an instrument that could be used to measure the entire EEM at one time. Researchers have developed such instruments, although their use is limited in that certain performance characteristics must be sacrificed in order to record the entire EEM at one time. We also note the variation known as a synchronously scanned spectrum. In this case, the excitation and emission wavelengths are varied with a fixed wavelength (or wavenumber) offset between them. In effect, the synchronously scanned spectrum is a slice of the full EEM. The apparent advantage of a synchronously scanned spectrum for analysis of a complex mixture is that the generally broad emission spectra are converted into a narrow series of peaks, making for easier visual interpretation of the spectrum. However, a synchronously scanned spectrum is not amenable to the multi-dimensional chemometric data processing methods.

WTMs have been extensively used to characterize the type of petroleum contamination. One approach is to record the entire temporal profile at a series of emission wavelengths with a digital storage oscilloscope; this procedure is analogous to the EEM approach which uses an array detector and a series of excitation wavelengths. Alternatively, the gate position of an intensified photodiode array (IPDA) or intensified CCD camera can be scanned in time to produce combined spectral-temporal data. The scan-time limits the rate of data collection for monitoring continuous processes. Changes in laser intensity or sample composition during a scan can cause variations in the intensity of the emission spectrum thus further compromising the data.

Unfortunately, these scanning systems are incapable of measuring temporal and spectral data following a single laser pulse. There have also been a few attempts to contemporaneously measure both temporal and spectral data, but these systems are either unduly complex and expensive or too slow to produce meaningful data. One approach uses a spectrograph to provide spectral resolution in a horizontal direction. A streak camera provides temporal resolution by moving the spectral image in the vertical direction. An image intensifier amplifies the image from the streak camera. A two dimensional detector such as a vidicon detector or charge coupled device records the output of the image intensifier. This system produces a wavelength-time matrix following a single laser pulse, but it is expensive to build and use.

In another approach, a photon counter based system uses an array of detectors to detect emissions from a body. The detector outputs are passed to a channel router that keeps track of the wavelength of the signals from the detectors. The channel router passes the signals to a photon counter that produces a wavelength-time matrix. This system uses multiple detectors and must work with low intensity emissions. Each detector must be individually calibrated thus complicating both data acquisition and analysis.

For the reasons stated above, and for other reasons stated below which will become apparent to those skilled in the art upon reading and understanding the present specification, there is a need in the art for an inexpensive and effective spectroscopic system and method for contemporaneously measuring temporal and spectral data.

SUMMARY OF THE INVENTION

The above mentioned problems with spectroscopic systems and methods and other problems are addressed by the present invention and will be understood by reading and studying the following specification. A spectroscopic system and method is described which uses an optical delay circuit and a single optical to electrical converter to generate contemporaneous spectral and temporal data to be used in determining the presence of compounds in a body.

In one embodiment, a spectroscopic system that processes spatially dispersed electromagnetic emissions at a number of wavelengths from a test material is provided. The spectroscopic system includes a converter that generates an electrical signal that is proportional to the intensity of electromagnetic radiation received by the converter. An optical delay circuit is coupled to an input of the converter. The optical delay circuit selectively delays application to the converter of electromagnetic emissions from the test material for at least one wavelength of electromagnetic emissions. A data processing circuit is coupled to an output of the converter. The data processing circuit records the value of the electrical signal from the converter over time so as to measure, contemporaneously, the intensity of electromagnetic emissions at each wavelength as a function of time. In one embodiment, the data processing circuit uses a reference emitter technique and curve fitting to extract the information. In another embodiment, the data processing circuit compares data output by the converter with a number of known waveforms to determine the constituent compounds in a mixture.

In one embodiment, the optical delay circuit includes a number of optical fibers. The optical fibers each have a different length and provide different wavelengths of light to the converter. Thus, each fiber delays transmission of light at a particular wavelength to the converter by a different amount of time. By doing this, the spectroscopic system is able to generate data that can be used to identify the compounds.

In another embodiment, the spectroscopic system includes a frequency shifter coupled to an input of the optical delay circuit. The frequency shifter includes a high quantum efficiency emitter that converts the frequency of the emissions from the compounds from a first range to a second range. Advantageously, the second frequency range is chosen to allow use of less expensive fiber optic cable in construction of the optical delay circuit.

In another embodiment, a method of applying an optical signal to a converter is provided. The method includes the step of delaying at least one wavelength of the optical signal relative to other wavelengths of the optical signal so that the wavelengths are applied to the converter at different times. Further, the method includes the step of recording the output of the converter.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense.

Figure 1:
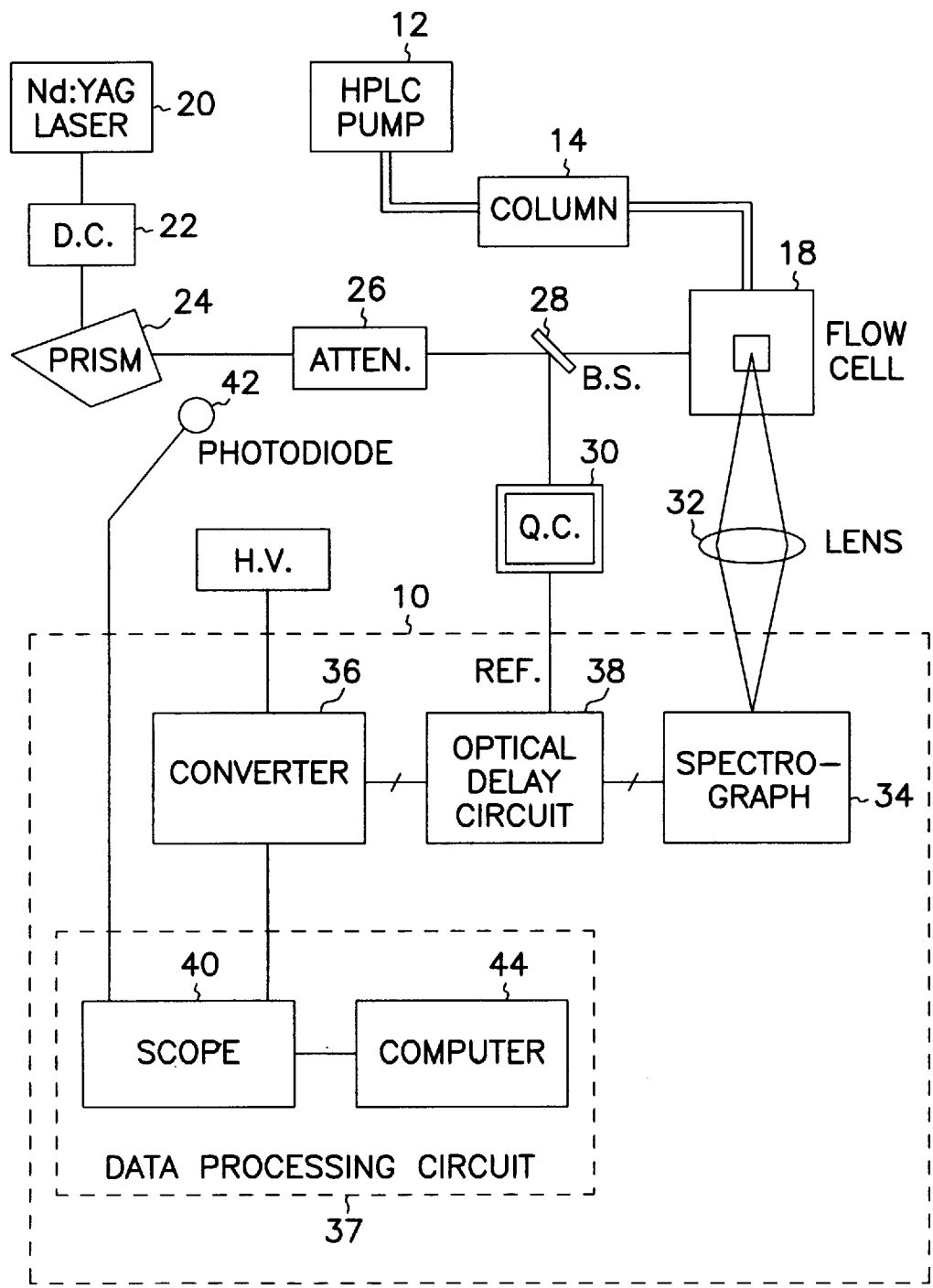
FIG. 1 is a block diagram of an illustrative embodiment of the present invention.

FIG. 1 is a block diagram of an illustrative embodiment of the present invention. The illustrative embodiment produces contemporaneous temporal and spectral data from a single laser pulse excitation of a substance using a single detector. The illustrative embodiment uses a novel optical delay circuit that delays multiple optical signals with different wavelengths, by different amounts of time to allow the intensity of each signal to be distinctly measured over time by a single detector. The optical delay circuit advantageously reduces the cost of the system by using the same detector to monitor multiple emissions at several wavelengths.

FIG. 1 illustrates an illustrative embodiment of the present invention that relates to fluorescence detection during High Performance Liquid Chromatography (HPLC) experiments. HPLC pump 12 provides a complex mixture of compounds for analysis by system 10. Column 14 is coupled between pump 12 and flow cell 18. Flow cell 18 comprises a square bore fluorescence flow cell. Pump 12, column 14, and flow cell 18 combine to provide the mixture to system 10 for spectroscopic analysis. It is understood that the mixture to be tested by system 10 can be provided by other sources such as contaminated soil, organs in a human body or other appropriate materials, mixtures and compounds that are subject to spectroscopic investigation.

System 10 employs an excitation source such as laser 20 of FIG. 1. Laser 20 excites the mixture to emit light to be detected and measured by system 10. Laser 20 may comprise, for example, a frequency doubled or frequency quadrupled Nd:YAG laser that produces laser pulses with a pulse duration that is on the order of 3 to 10 nanoseconds (ns).

Photoluminescence processes can be characterized by the average time interval between the photoexcitation and photoemission processes. This time interval can be interpreted in terms of a lifetime of the emitting molecular state. The luminescence lifetime can be determined by a mathematical analysis of the time-dependent emission intensity created by pulsed or amplitude-modulated excitation. A laser pulse of short duration is often preferred as an excitation source for lifetime determination because it provides better sensitivity, accuracy, and precision. In other embodiments, other sources of electromagnetic energy, for example a flashlamp, can be used in place of the laser. During phase-resolved measurements with an amplitude modulated source the lifetime is determined from the demodulation factor or the phase-shift factor.

In some embodiments, the duration of each laser pulse could be reduced to as little as 0.1 nanoseconds (ns). The output of laser 20 is provided to doubling crystal 22 which doubles the frequency of the light from laser 20. The light passes to flow cell 18 through prism 24 and attenuator 26. Beam splitter 28 is placed between attenuator 26 and flow cell 18. Beam splitter 28 passes the light from laser 20 to flow cell 18 and as a reference to quantum counter 30.

System 10 detects light emitted by the mixture after excitation in flow cell 18 by light from laser 20. System 10 includes spectrograph 34, optical delay circuit 38, converter 36, and data processing circuit 37. Lens 32 is placed between flow cell 18 and spectrograph 34 to focus the emitted light from the mixture in flow cell 18 on spectrograph 34. Spectrograph 34 may comprise, for example, an Acton Spectro Pro 150 or Spex 270M or other appropriate spectrograph. Spectrograph 34 is coupled to optical to electrical converter 36 by optical delay circuit 38. Converter 36 may comprise a photomultiplier tube such as a Hamamatsu R928. Other converters that produce an output signal that is a function of the intensity of an input signal to the converter could be used based on the cost, time response and current gain needed for a specific application.

System 10 analyzes the output from converter 36 with data processing circuit 37. Specifically, data processing circuit 37 in this embodiment comprises scope 40 and computer 44. Scope 40 is coupled to the output of converter 36. Scope 40 may comprise a Tektronix 620 or other appropriate device for recording the electric signal generated by converter 36. Photodiode 42 is coupled to an input of scope 40 to provide a signal indicating when laser 20 has fired so as to initiate recording of the electric signal by scope 40. Computer 44 is coupled to receive data from scope 40 to produce a wavelength-time matrix for the mixture in flow cell 18 as described more fully below.

In operation, system 10 performs a photoluminescence operation on a mixture to gain contemporaneous spectral and temporal information to be used in identifying the components of the mixture. For example, system 10 can produce a wavelength-time matrix for the mixture from HPLC pump 12. HPLC pump 12 provides the mixture to column 14. The function of column 14 is to resolve the complex mixture from pump 12 to gain spatial separation of the chemical species of the mixture based on the elution time of the chemical species in the mixture. Elution time is the time it takes a chemical species to pass through column 14. The elution time can range, for example, from as little as 5 minutes to as much as an half hour based on the chemical species involved. The mixture flows through flow cell 18 and is radiated with light from laser 20. For example, laser 20 may produce pulses of light having a wavelength on the order of 532 nanometer (nm). Doubling crystal 22 changes the wavelength of the light to 266 nm. The wavelength of the light from laser 20 is chosen so as to excite emission from compounds that might exist in the mixture tested by system 10. Thus, the 266 nm wavelength is mentioned here by way of example and not by way of limitation. Other wavelengths of light and other excitation sources may be used without departing from the spirit and scope of the present invention.

The constituents of the mixture are excited by the light from laser 20 in flow cell 18. Lens 32 focuses the emitted light from the mixture on an entrance slit of spectrograph 34. Spectrograph 34 disperses the light to spatially separate optical signals of various wavelengths. Optical delay circuit 38 passes the optical signals to converter 36. Optical delay circuit 38 selectively delays the optical signals at different wavelengths such that contemporaneous optical signals from spectrograph 34 at the different wavelengths arrive at converter 36 at different times. An example of optical delay circuit 38 is described below with respect to FIG. 6. With the use of optical delay circuit 38, a single converter 36 can be used to measure spectral and temporal data that occur contemporaneously by selectively delaying the application of the optical signals to converter 36. Converter 36 produces electrical signals that are proportional to the intensity of the optical signals from spectrograph 34. Scope 40 records the data from converter 36. Scope 40 further averages the data for several pulses from laser 20 and then sends the averaged data to computer 44. Computer 44 extracts information from the averaged data that assists in identifying the substance that produced the emissions. This information includes the intensity of emissions at identified wavelengths and decay time of the emissions. Other information that can be used to identify the compounds of the mixture include: elution time, depth of a probe during a push, or reaction time during a chemical reaction.

The averaged data are referred to as the "observed decay profile" or "waveform" and is a compilation of time-shifted decay profiles of the emissions of a chemical substance at different wavelengths in response to the light from laser 20. Essentially, delay element 38 introduces the time shift to each of the constituent decay profiles so that a single converter 38 can be used to capture contemporaneous data at the different wavelengths.

In some instances, portions of the constituent decay profiles can overlap in time producing an additive effect in the observed decay profile as measured by converter 36. An example of an observed decay profile is shown by way of example as waveform 218 in FIG. 4. From inspection of FIG. 4, it can be seen that waveform 218 comprises at least four overlapping emissions which decay over time as expected. The wavelengths of emissions responsible for the peaks are shown on FIG. 4 next to the associated peaks. In one embodiment, computer 44 is programmed to extract information of the constituent decay profiles from the observed decay profile even though optical delay circuit 38 does not delay the optical signals of the different wavelengths by enough time to allow separate recordation of the optical signals at each wavelength.

Computer 44 uses curve fitting procedures to extract the constituent decay profiles at the different wavelengths, which can be used to identify the substance. In addition to the observed decay profile, the curve fitting requires that the laser excitation profile and delay times must be known at each detection wavelength represented in the optical delay circuit 38. Measurement of the laser excitation profile and delay times is complicated by the fact that light of different wavelengths travel at different speeds through optical decay circuit 38. To compensate for this, a reference emitter technique is used. A compound with a known lifetime that has an emission spectrum which covers the range of wavelengths observed in the experiment is excited by laser 20. A decay profile measured under the same conditions as the experiment with the reference emitter as sample is known as the reference profile. The reference profile is used by computer 44 to calculate the laser profile and delay times at each wavelength as described below.

In one embodiment, a cuvette of p-terphenyl (PTP) dissolved in cyclohexane is substituted for cell 18 of FIG. 1 to act as the reference emitter. PTP is an acceptable substance for the reference emitter due to its broad emission spectrum and short lifetime. Other substances with similar characteristics could be substituted for PTP. Laser 20 emits light on the sample of PTP and a number of waveforms are collected and stored in computer 44.

Figure 2:
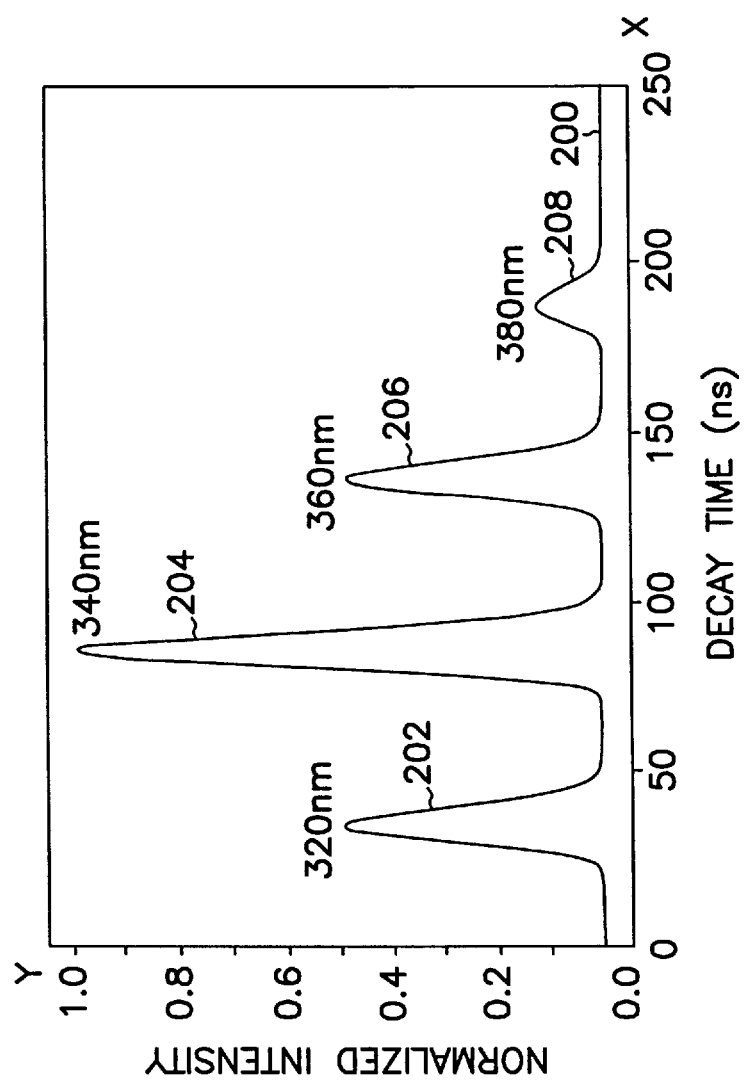
FIG. 2 is a graph that illustrates an embodiment of a reference emitter profile for use in analyzing the data from the system of FIG. 1.

FIG. 2 is a graph that illustrates waveform 200 that is the average of the waveforms collected by computer 44. Waveform 200 comprises PTP emissions at 320, 340, 360 and 380 nm that are represented by peaks 202, 204, 206, and 208, respectively. As shown, peaks 202, 204, 206, and 208 are separated from adjacent peaks by approximately 50 ns due to the delay introduced by optical delay circuit 38. Peaks 202, 204, 206 and 208 have different intensities due to PTP's emission spectrum and attenuation in optical delay circuit 38.

The laser profile for system 10 is calculated from waveform 200 according to the following equation:

$$L(t) = \frac{R(t)}{\tau} + \dot{R}(t) \tag{1}$$

Figure 3:
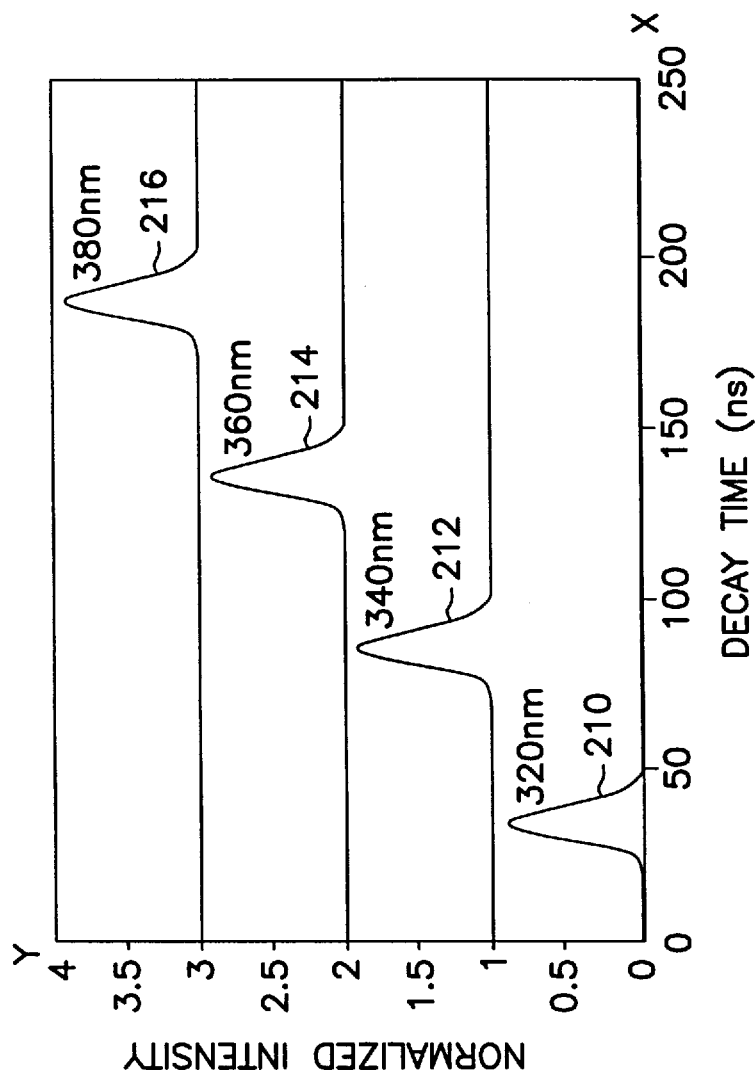
FIG. 3 is a graph that illustrates an embodiment of calculated laser profiles for use in analyzing data from the system of FIG. 1.

In equation (1), the laser profile is represented as L(t). This is the only unknown in equation (1). R(t) is waveform 200, $\tau$ is the lifetime of PTP in cyclohexane and $\dot{R}(t)$ is the time derivative of the reference emitter. The lifetime of PTP is approximately 1 ns. To simplify the analysis of equation (1), waveform 200 can be viewed as resulting from four identical samples that are illuminated by different laser pulses at different times, e.g. at 50 ns intervals. In this hypothetical experiment, the emissions from the sample illuminated with the first laser pulse are filtered to pass light near 320 nm. The emissions from the sample illuminated 50 ns later is filtered to pass light near 340 nm and so forth. With waveform 200 thus broken down into four separate waveforms, equation (1) yields four laser profiles, 210, 212, 214, and 216 as shown in FIG. 3.

With the laser profiles in-hand, it is now possible to analyze data from an unidentified substance. The curve fitting process is represented by equation (2):

$$W(t,T;\lambda)=D(t,\lambda;\tau) \times A(\lambda,T) \tag{2}$$

Figure 4:
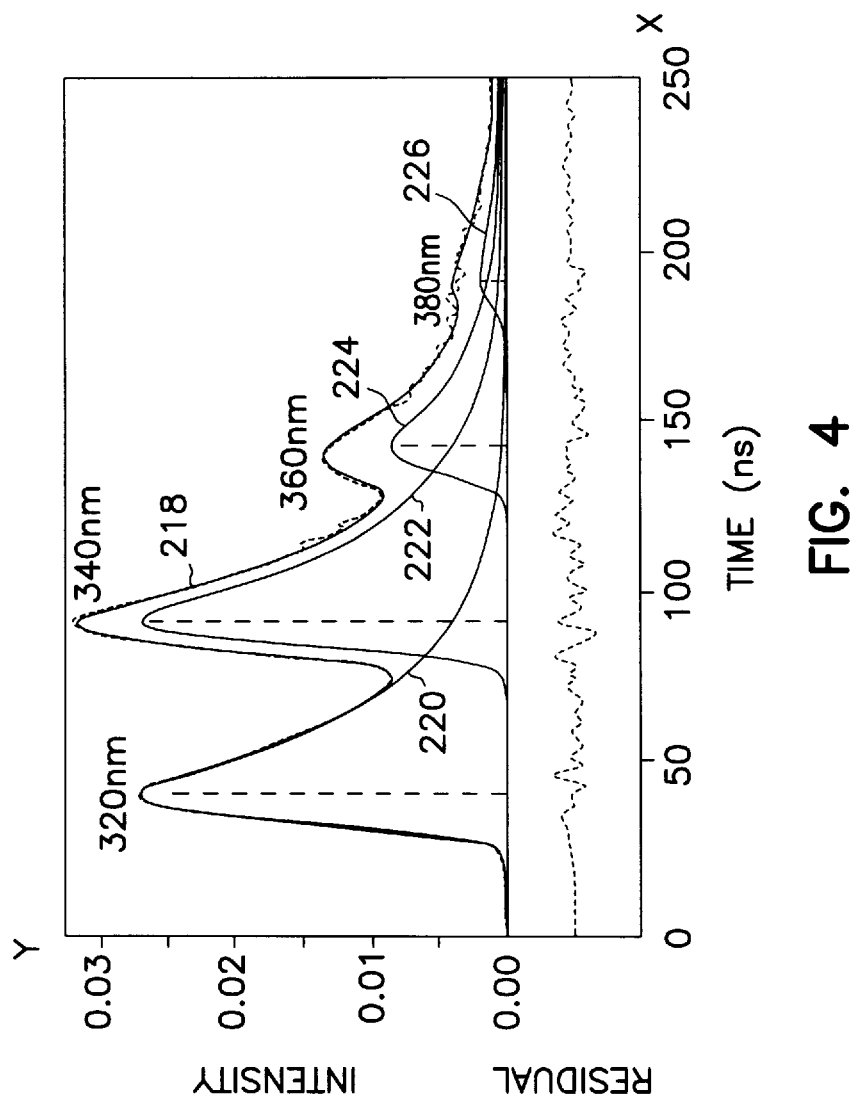
FIG. 4 is a graph that illustrates exemplary output of the system of FIG. 1.

In equation (2), t is the time over which the signals decay as determined by converter 36 and data processing circuit 37, $\lambda$ represents the detection wavelengths, $\tau$ is the lifetime(s) of the emitting compound(s). T is some variable that depends parametrically on time and identifies the columns of W. T could be, for example, the depth during a fluorescence versus depth experiment, the elution time during an HPLC experiment or the reaction time during a chemical kinetics experiment. In the simplest case, W is a matrix with a single column of numbers that represent the value of an observed decay profile over a period of time, such as the data points of FIG. 4. In one embodiment, W may include as many as 500 data points. D is a matrix that contains the calculated profiles that computer 44 uses to fit to waveform 218. FIG. 4 shows exemplary calculated profiles 220, 222, 224 and 226. Each calculated profile is stored as a column of the matrix D. The matrix profiles are obtained by convolving laser profiles 210, 212, 214, and 216 of FIG. 3 with a selected exponential decay. In this example, all of the decay profiles have the same lifetime, τ. The final term in equation (2) is the vector A. The vector A gives the amplitude of each decay profile 220, 222, 224, and 226 of FIG. 4.

Computer 44 solves equation (2) by an iterative search for the best lifetime, τ, and set of amplitudes for matrix A. An acceptable fit is obtained when the sum of the squares of the residual, as shown in the lower portion of FIG. 4, is at a minimum. In practice, an initial lifetime value is convolved with the laser profiles 210, 212, 214, and 216 to form the matrix D. A set of amplitudes, A, is then calculated according to equation (3):

$$A = Inv(D'D)D'W \qquad (3)$$

In equation (3). D' is the transpose of matrix D. The sum of squared residuals, referred to as "chi-squared," is then computed. Computer 44 then varies τ and the A vector until chi-squared is at a minimum.

Figure 5:
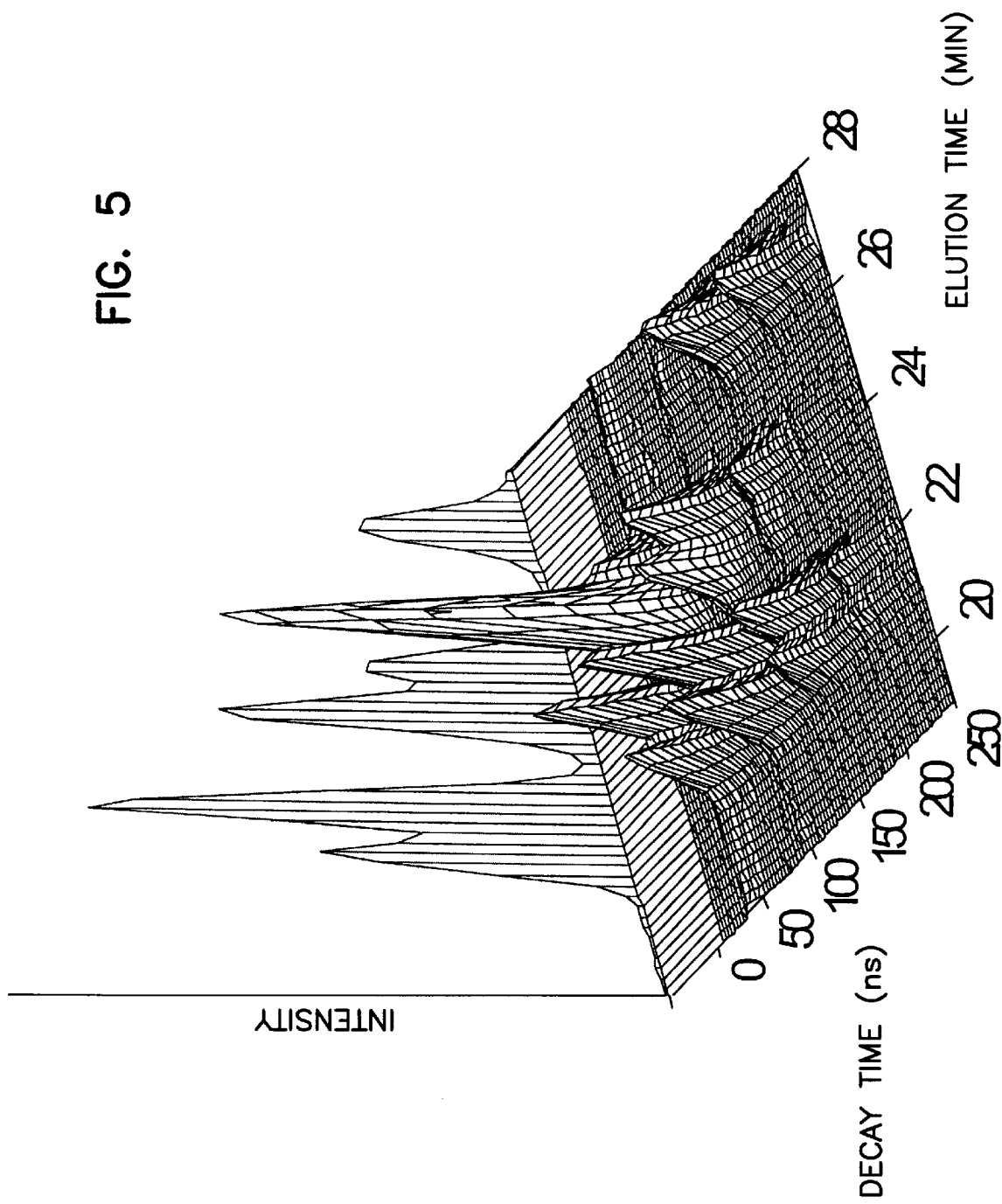
FIG. 5 is a three dimensional graph that illustrates exemplary output of data from the system of FIG. 1.

The same approach can be used to fit a single waveform to two lifetimes. The matrix D would include eight columns. The first four columns for laser profiles 210, 212, 214, and 216 are convolved with the first lifetime and the second four columns for profiles 210, 212, 214 and 216 are convolved with the second lifetime. In this case, 4 is a matrix with one column and eight rows. The first four rows correspond to amplitudes for the first lifetime and the second four rows corresponding to the second lifetime. Similarly, the matrix W can be expanded to include a number of columns, each column corresponding to a different observed waveform. For example, FIG. 5 depicts a three-dimensional graph of a number of decay profiles. The intensity of the optical signal detected by converter 38 is shown along the z-axis. An observed decay profile for use in matrix W is generated by taking the z values along the x-axis (decay time) for a fixed value of the y-axis (e.g., elution time).

The signal from quantum counter 30 is used to normalize the data for fluctuations in the intensity of laser 20. This signal could also be used to monitor the laser output for pulse width stability and to provide data where deconvolution is used. Further, this signal can be used to monitor a sample with known properties to provide data for internal calibration and normalization.

Figure 6:
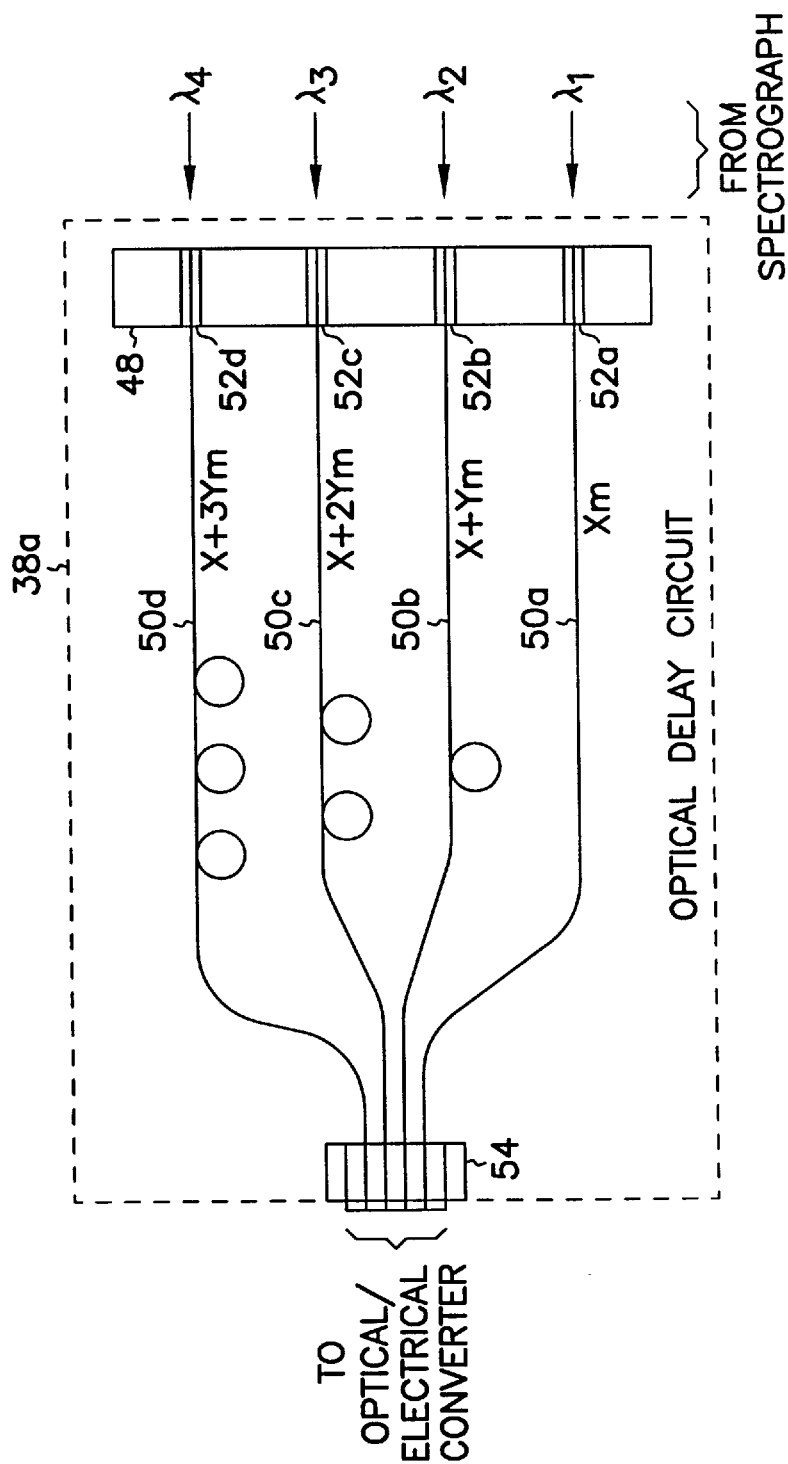
FIG. 6 is a schematic diagram of an embodiment of an optical delay circuit for use with the illustrative embodiment of FIG. 1.

FIG. 6 is an illustrative embodiment of an optical delay circuit 38a for use with system 10 of FIG. 1. Circuit 38a receives a plurality of optical signals having different wavelengths from spectrograph 34. In FIG. 6, spectrograph 34 outputs four optical signals to optical delay circuit 38a. However, it is understood that circuit 38a can be modified to work with any appropriate number of optical signals from spectrograph 34. Circuit 38a delays the optical signals such that a single converter 36 can be used to produce data for scope 40 and computer 44 to distinguish the spectral and temporal data from the mixture.

Circuit 38a includes plate 48 that is mounted at the exit focal plane of spectrograph 34. Optical fibers 50a through 50d are placed in holes 52a through 52d. At an opposite end, optical fibers 50a through 50d are fastened to ring 54 in front of converter 36. The grating position and linear dispersion of spectrograph 34 along with the position of holes 52a through 52d in plate 48 determine the spectral region probed by each fiber 50a through 50d. It is noted that fibers 50a through 50b can each include one or more optical fibers that are situated side-by-side, or stacked vertically, at holes 50a through 50d, respectively. Using multiple fibers for each fiber 50a through 50d allows for efficient capture of optical signals of the appropriate wavelength without wasting capacity of the optical fiber. Fibers 50a through 50d vary in length. For example, as shown, the loops in fibers 50b, 50c, and 50d represent 10 meter lengths of fiber. Each 10 meter length of fiber represents a delay of approximately 50 ns in transmitting the optical signal for the fiber to converter 36.

In operation, optical delay circuit 38a enables system 10 to gather contemporaneous temporal and spectral data with a single detector. Optical delay circuit 38a passes the optical signals to converter 36 over fibers 50a through 50d. Fibers 50b, 50c and 50d delay their optical signals by approximately 50, 100 and 150 ns, respectively. Thus, optical delay circuit 38a passes the optical signals after successive 50 nanosecond delays. It is noted that an optical signal can provide data representing intensity of emissions from a compound that exceed the time interval designated for the optical signal by programming computer 44 to account for the overlapping data from more than one optical signal. It is also noted that the length of optical fibers 50a through 50d can be altered to establish an appropriate delay for a particular application.

Figure 7:
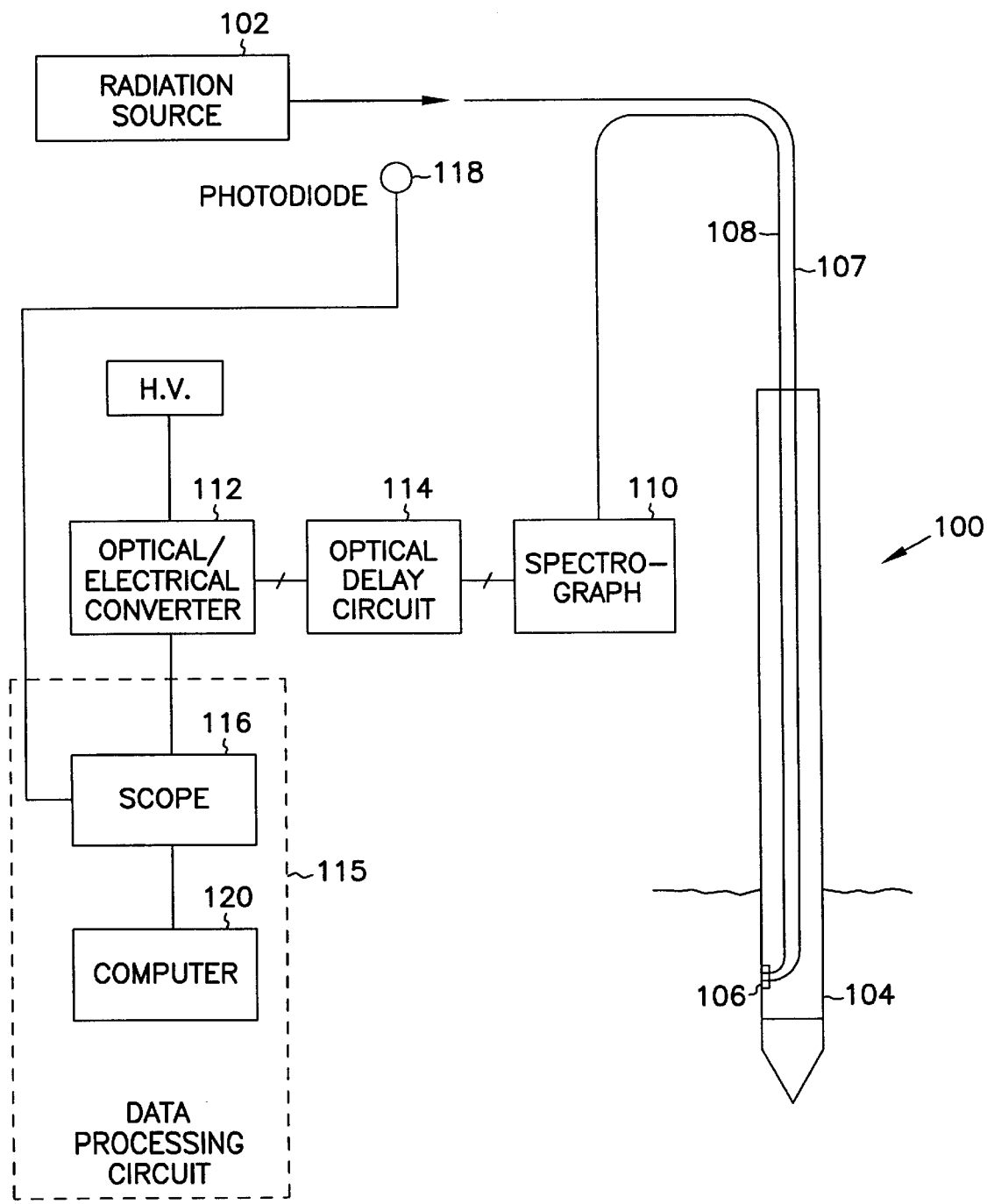
FIG. 7 is another illustrative embodiment of the present invention.

FIG. 7 illustrates another embodiment of the present invention. This embodiment can be used, for example, in probing soil to determine the existence and levels of contamination in the soil. System 100 includes radiation source 102 that produces pulsed radiation to excite emissions from compounds in the soil. For example, radiation source 102 comprises an Nd:YAG laser. Radiation source 102 is optically coupled to probe 104 through optical fiber cable 107 to radiate the laser pulses through window 106. Emissions from contaminants are received by probe 104 through window 106 at return fiber optic cable 108. Return fiber optic cable 108 is optically coupled to spectrograph 110. Spectrograph 110 is coupled to optical to electrical converter 112 by optical delay circuit 114. Optical delay circuit 114 may be constructed, for example, as shown and described with respect to FIG. 6, above. System 100 further includes data processing circuit 115. In one embodiment, data processing circuit 115 includes scope 116 and computer 120.

Scope 116 records data from converter 112. Scope 116 is coupled to photodiode 118 which acts as a trigger for scope 116 to record data when radiation source 102 produces the pulsed radiation. Computer 120 processes the data from scope 116 to produce a wavelength-time matrix using, for example, the technique described above with respect to FIG. 1.

In operation, probe 104 is pushed into the ground where, for example, the soil is to be tested for contaminants. Radiation source 102 radiates light, such as laser pulses, through window 106 during the push. Contaminants in the soil emit light which is received at window 106 by fiber optic cable 108. Spectrograph 1 10 disperses the light from fiber optic cable 108 and provides optical signals having different wavelengths to optical delay circuit 114. As with optical delay circuit 38 of FIG. 1, optical delay circuit 114 selectively delays the optical signals at different wavelengths such that contemporaneous optical signal outputs of spectrograph 110 at the different wavelengths arrive at converter 112 at different times. With the use of optical delay circuit 114, a single converter 112 can be used to measure spectral and temporal data for optical signals that occur contemporaneously by selectively applying the optical signal for each wavelength to converter 112 after established delays. Converter 112 provides its output to scope 116. Computer 120 uses the data from scope 116 to produce a wavelength-time matrix using the technique described above with respect to FIG. 1.

The embodiment of FIG. 7 is advantageously suited to producing data to be used in identifying fuel-type soil contaminants. Experiments were conducted to test the accuracy of system 100. The results of these experiments are described here.

Sample Preparation

Fuel samples of 2000 mg/kg (parts per million, ppm) were prepared by mixing 60 mg of fuel with 30 g of Fisher Sea sand containing 10% water (henceforth simply referred to as sand). The fuel/sand mixtures were tightly sealed in Teflon bottles and were shaken in a paint shaker for 15 minutes to homogenize the samples. Measured component masses and calculated concentrations for each fuel are reported in Table 1.

TABLE 1

| Fuel | Name | Mass of Sand/g | Mass of Fuel/mg | Concen./ppm |
|---|---|---|---|---|
| Unleaded Gasoline | ung | 30.021 | 61 | 2030 |
| Jet Fuel | jet | 30.027 | 67 | 2230 |
| Diesel #2 | di2 | 30.032 | 64 | 2130 |
| Motor Oil, SAE 30 | mot | 30.015 | 65 | 2160 |
| Diesel #5 | di5 | 30.016 | 80 | 2660 |
| Creosote | cre | 30.049 | 73 | 2430 |
| Reduced Un. Gas.[1] | red | 30.002 | 63 | 2100[2] |

Notes:
[1]Reduced unleaded gasoline was previously prepared by allowing unleaded gasoline to stand open to the atmosphere until 55% of the original volume had evaporated. This sample was contained in a Nalgene, not Teflon, bottle.
[2]Apparently this sample was not adequately homogenized. The reported concentration is an average concentration. The actual concentration of a given portion of the sample is not accurately known.

These 2000 ppm standard fuel samples were diluted with sand to make 300 ppm samples. Measured component masses and calculated concentrations are reported in Table 2. Tables 1 defines abbreviated names for each fuel type.

TABLE 2

| Fuel | Mass of 2000 ppm/g | Mass of Sand/g | Concen./ppm |
|---|---|---|---|
| Unleaded Gasoline | 25.614 | 4.446 | 300 |
| Jet Fuel | 25.585 | 3.976 | 300 |
| Diesel #2 | 25.462 | 4.201 | 302 |
| Motor Oil | 25.467 | 4.104 | 300 |
| Diesel #5 | 25.558 | 3.265 | 301 |
| Creosote | 25.533 | 3.595 | 300 |
| Reduced Un. Gas. | 25.524 | 4.402 | 309[2] |

Notes:
1. The 300 ppm concentrations were calculated as follows.
$$\text{Concen}(300) = \frac{\text{Concen}(2000) \times M(\text{sand})}{M(\text{sand}) + M(2000)}$$
[2]This sample was prepared from an apparently inadequately homogenized standard sample. This sample may also be inadequately homogenized. The reported concentration is probably meaningless.

Data Collection

Data were collected with system 100 using a four fiber optical delay circuit such as the type shown in FIG. 6. The wavelength range of spectrograph 110 was centered on 418 nm, thus allowing detection at 320, 374, 428 and 482 nm. Approximately 180 microjoules ($\mu$J) of 290 nm laser light was focused onto the fiber optic leading to the sample. In this experiment, system 100 was constructed with a 10 m fiber optic cable 107. Typically, fiber optic cable 107 is on the order of 50 m in length. Scope 116 and converter 112 were coupled with a 2 meter coaxial cable in place of the typical 8 meter cable. Aside from a time shift, these substitutions are not expected to affect the results.

Samples were compressed into sample holders immediately prior to data collection. The sample holders were slowly rotated by hand as the system acquired waveforms. Each acquisition was the average of 50 pulses from radiation source 102. Approximately 20 waveforms were collected for each fuel type. A background signal (bkg) was obtained with an unspiked sand sample at the beginning of the run and between each fuel type. All 2000 ppm data except the reduced unleaded gasoline data were collected in one day. All 300 ppm and 2000 ppm reduced unleaded gasoline data were collected the following day.

Figure 8A:
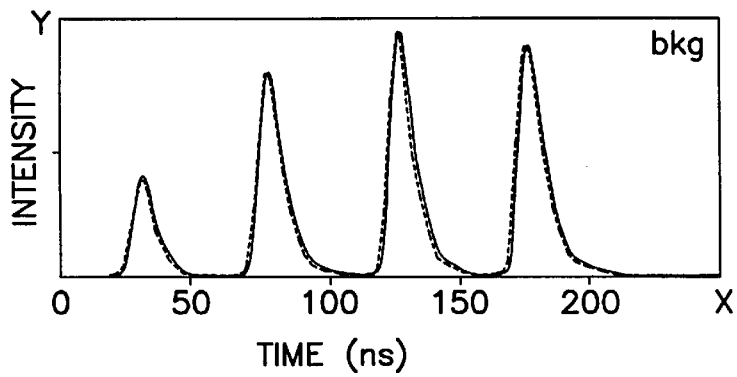
FIGS. 8a through 8h are graphs that illustrates decay profiles of emissions from various chemical substances at a number of frequencies for 2000 and 300 ppm samples of the substances.
Figure 8B:
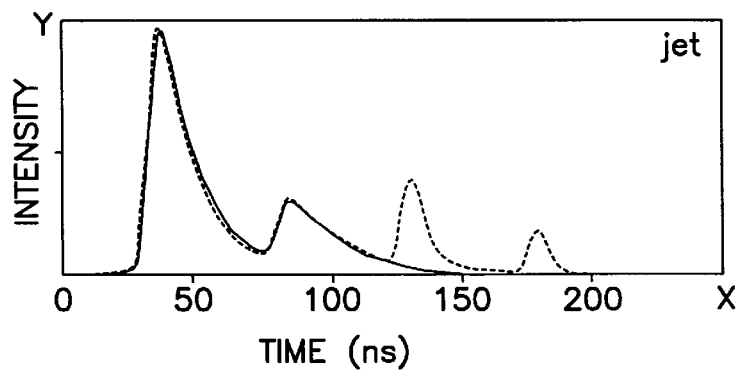
Figure 8C:
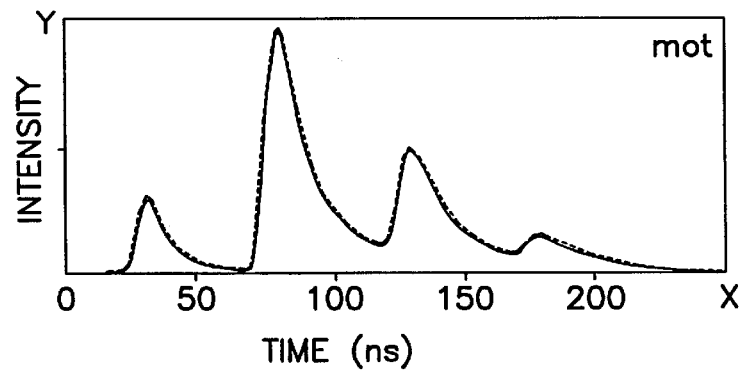
Figure 8D:
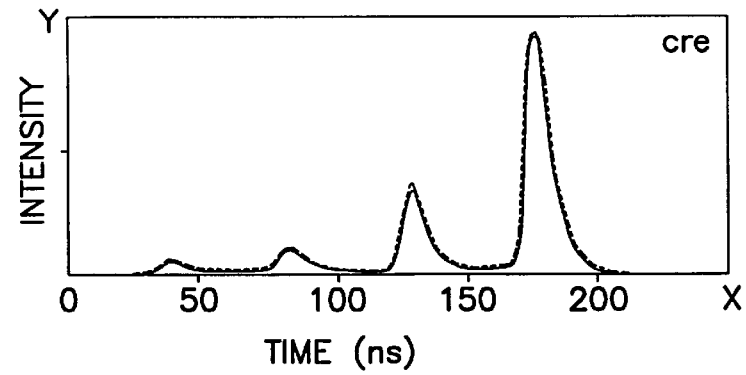
Figure 8E:
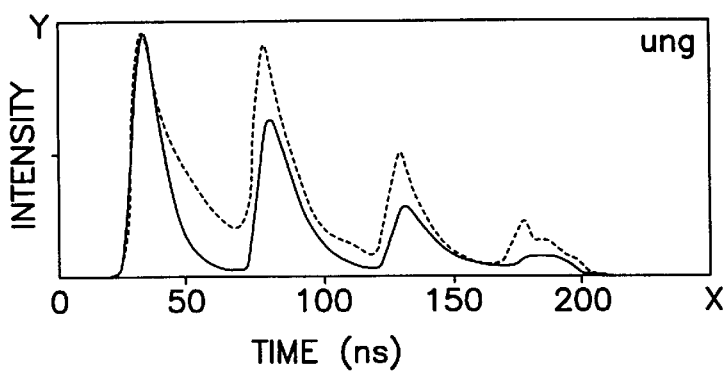
Figure 8F:
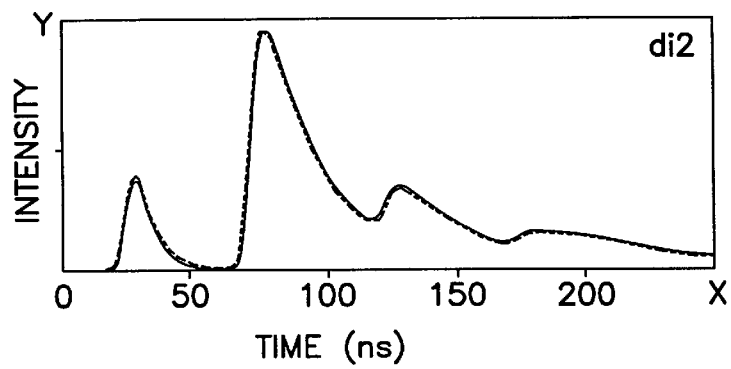
Figure 8G:
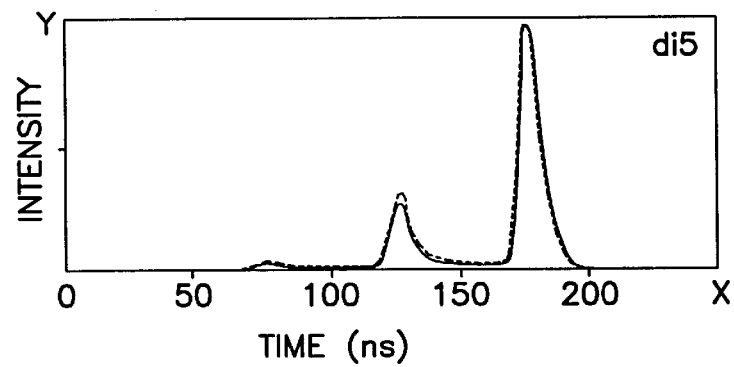
Figure 8H:
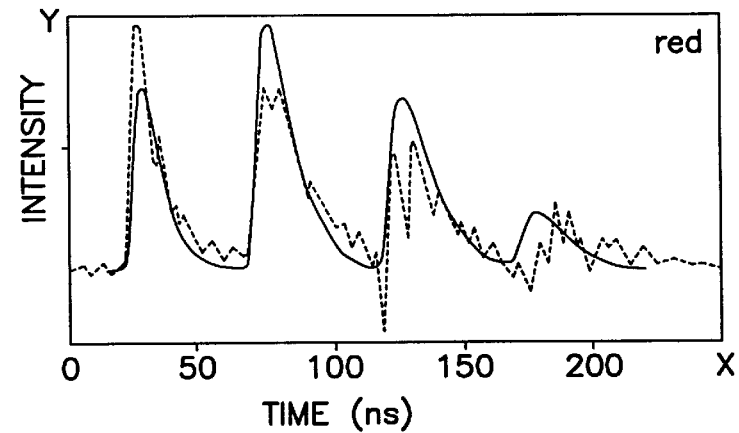
Figure 9A:
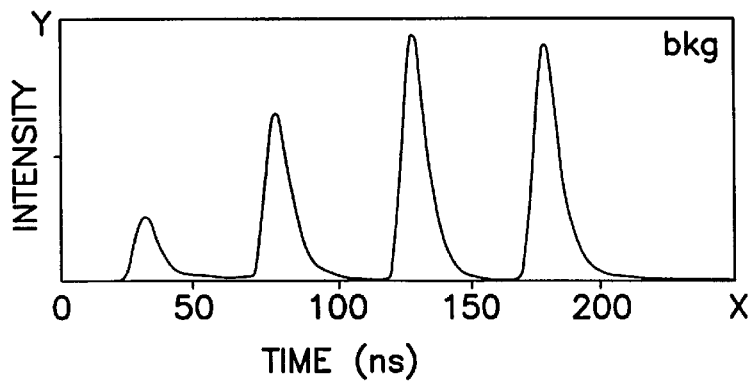
FIGS. 9a through 9h are graphs that illustrates average decay profiles of emissions from various chemical substances at a number of frequencies.
Figure 9B:
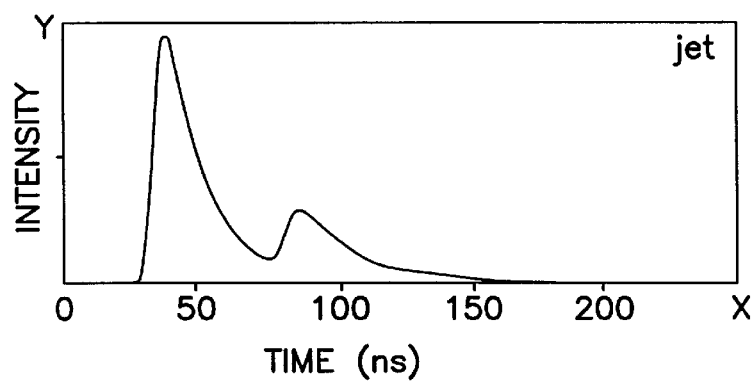
Figure 9C:
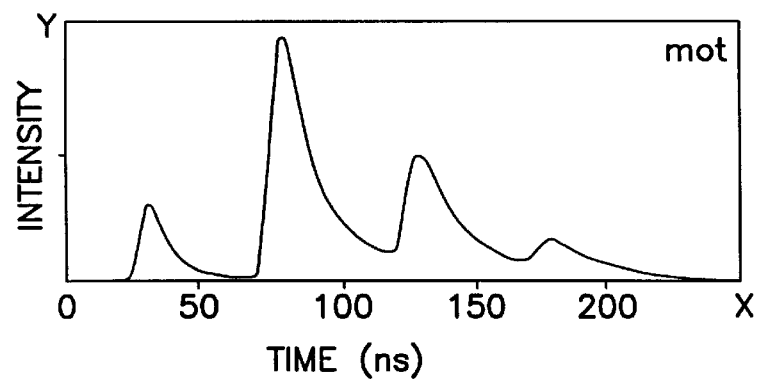
Figure 9D:
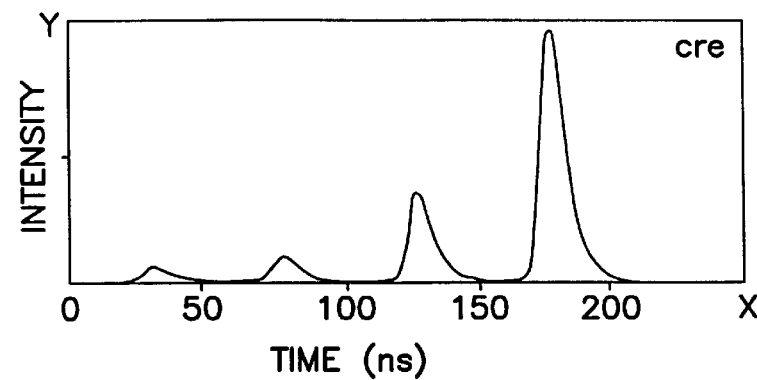
Figure 9E:
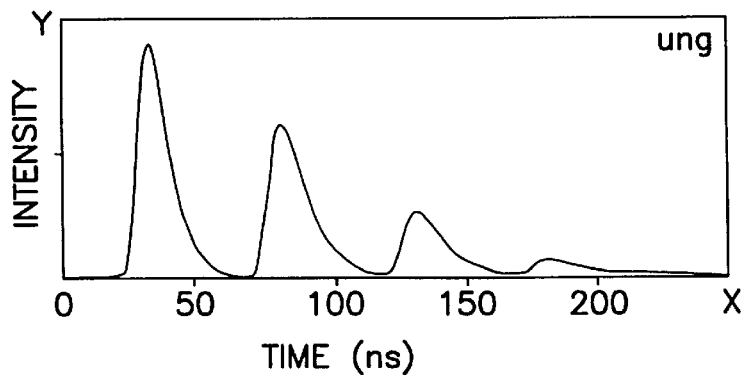
Figure 9F:
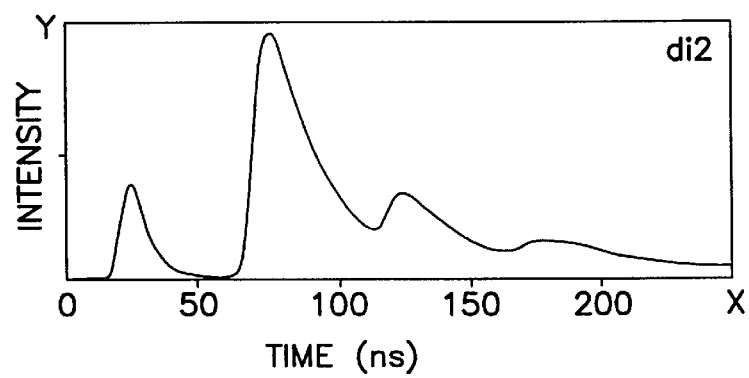
Figure 9G:
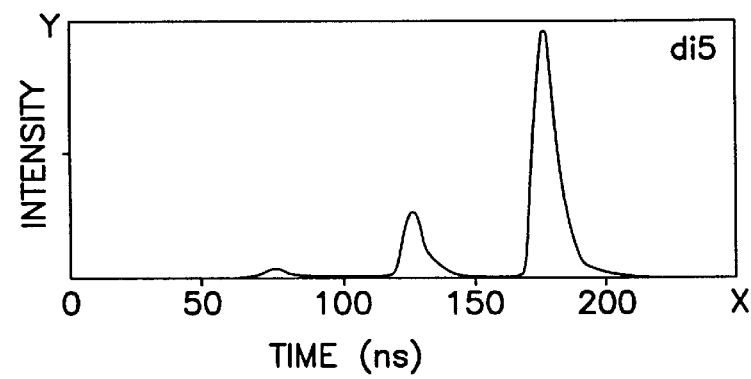
Figure 9H:
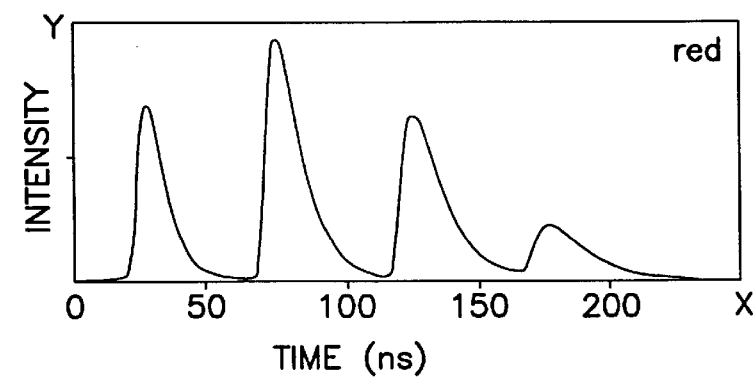

Data from the 2000 and 300 ppm samples are presented in FIGS. 8A through 8H. The sample associated with each of FIGS. 8A through 8H are identified on the figures by the same abbreviations as used in Table 1. The waveforms in FIGS. 8A through 8H each consist of the output of converter 112 in response to light at 320 nm followed by the 374, 428 and 482 nm responses after successive 50 ns delays. In all cases the 300 ppm profiles are shown by dashed lines and the 2000 ppm profiles are shown by solid lines. There is a small time shift between the 300 ppm data and the 2000 ppm data which does affect the analysis. The background profiles from different days are slightly different. It is noted that there is very little variance between the corresponding 2000 and 300 ppm profiles for diesel #2, motor oil, diesel #5 and creosote. FIG. 8E shows that the decay times and spectral distributions differ substantially between the 2000 and 300 ppm samples of unleaded gasoline. This is most likely due to differences in quenching or energy transfer kinetics at these concentrations. The jet fuel results are essentially identical at 320 and 374 nm, but differ at 428 and 482 nm. No attempt was made to discover the origin of this result. The reduced unleaded gasoline results indicate a problem with the 300 ppm sample. The signal level was barely above background, thus indicating a much lower concentration than expected. Presumably the 2000 ppm sample from which the 300 ppm sample was made was not properly homogenized.

Data Analysis

Computer 120 is programmed to identify constituent fuels of a mixture during a push using the procedure described below with respect to equation (4). Basically, computer 120 uses a curve fitting procedure to replicate an observed decay profile based on decay profiles for known compounds that could be in the mixture.

$$Bc = d \tag{4}$$

In equation (4), B is a matrix in which each column comprises one of the decay profiles from FIGS. 9A through 9H. FIGS. 9A through 9H are averaged versions of the waveforms shown in FIGS. 8A through 8H, respectively. Each column is divided by the fuel concentration reported in Table 1. The reduced unleaded gasoline waveform was not included in the final version of B. The first column of B is an average background profile scaled to comparable intensity to the other columns of B. The vector d is an observed waveform.

The only unknown in equation (4) is the vector c. Equation (4) is solved to produce a set of coefficients in vector c that indicate how much of each decay profile from matrix B is needed to produce the observed decay profile of vector d.

A non-negative least squares approach using the Matlab environment was used to find the values for the vector c. The matrix B forms a basis set that accommodates most of the instrumental response function and sample properties. Hence, no laser profiles or deconvolution are required in this approach. A stable instrument response function (i.e. a stable experimental apparatus) and a basis set that includes the analyte are the only requirements. If the intensity of each analyte scales linearly with concentration up to 2000 ppm the coefficients c directly give the concentrations of the analytes contributing to the waveform. The averaged waveforms of FIGS. 9A through 9H were provided to computer 120 to test the accuracy of system 100.

Results

Figure 10A:
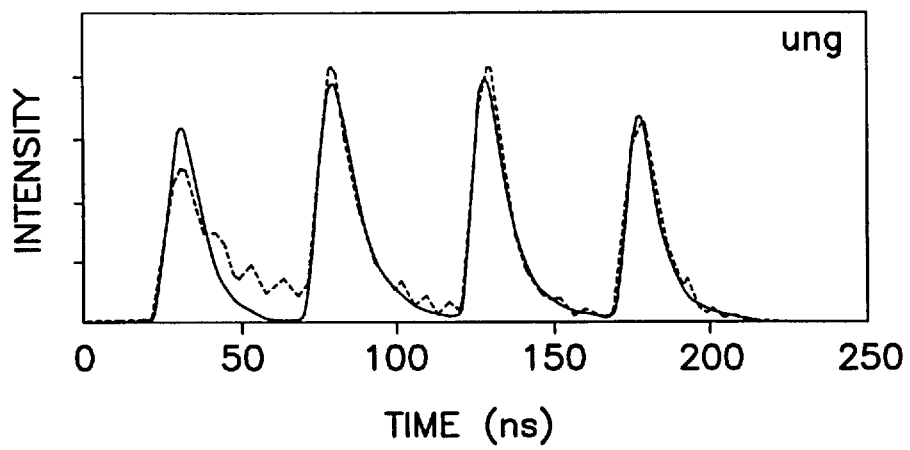
FIGS. 10a and 10b are graphs that illustrate raw data and a calculated fit from the decay profiles of FIGS. 9a through 9h.
Figure 10B:
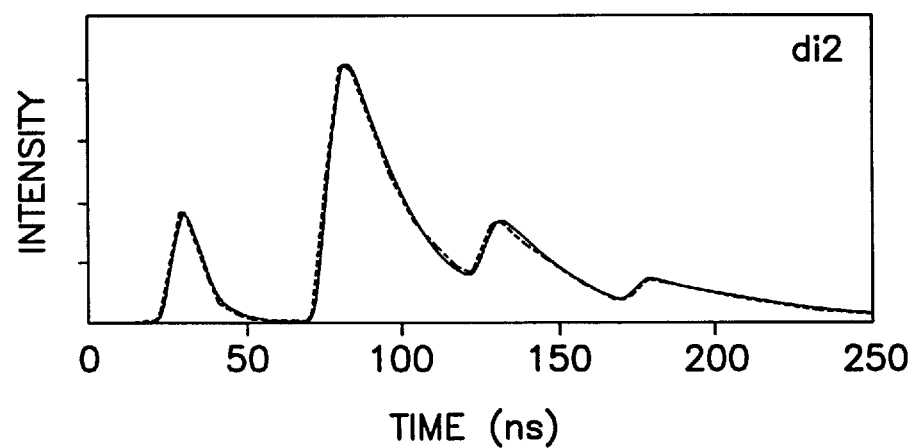

FIGS. 10A and 10B show results obtained with this approach. In FIG. 10A, the dashed line is the raw data for unleaded gasoline with a concentration of 300 ppm and the solid line is the fitted curve generated by computer 120. Similarly, FIG. 10B shows the raw data for diesel #2 for the 300 ppm data set with a dashed line and the curve generated by computer 120 with a solid line.

Figure 11:
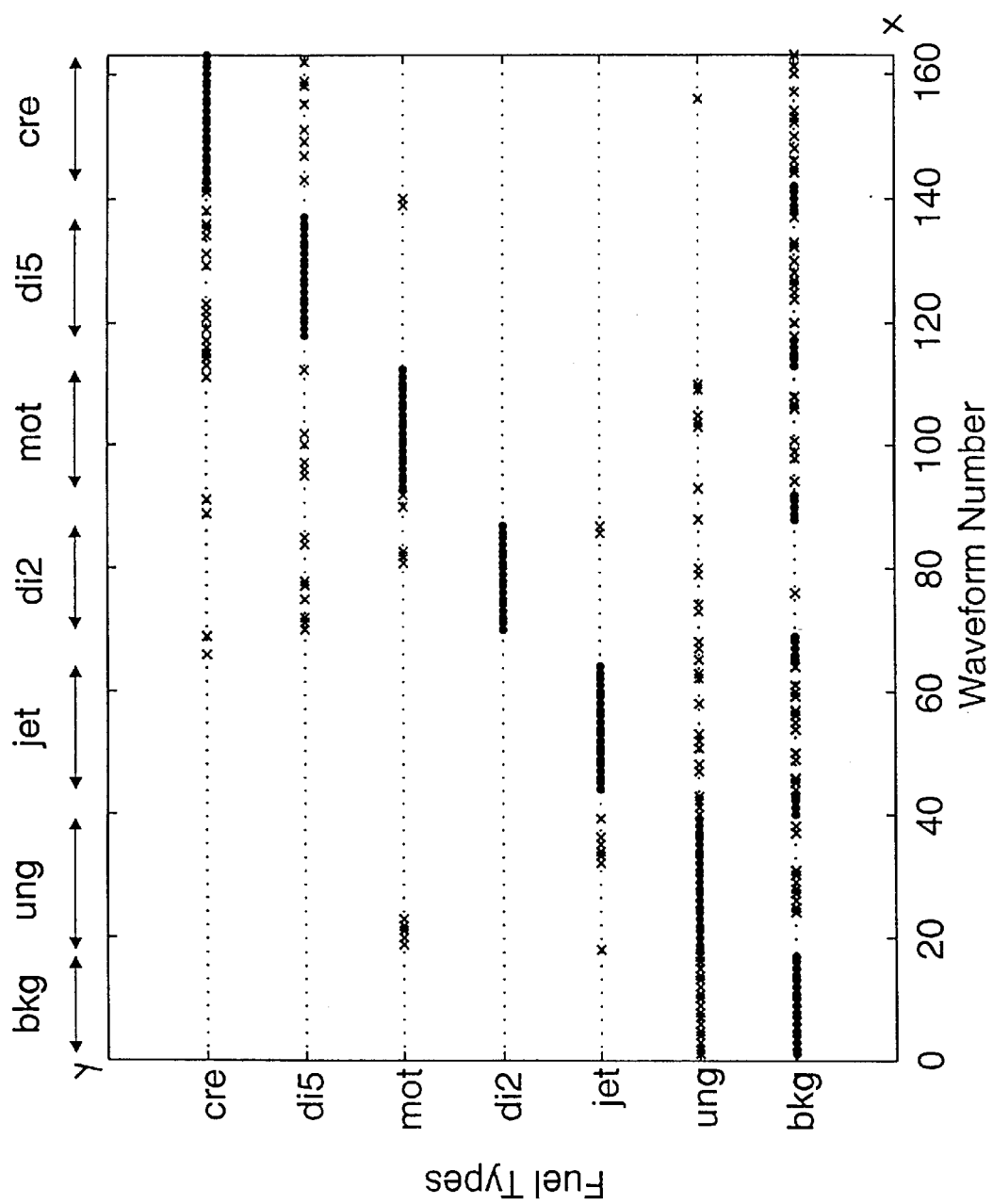
FIG. 11 is a graph that illustrates results of experiments with an embodiment of the present invention for identifying known fuel samples with a 2000 ppm concentration.

The ability of computer 120 to identify fuel types was tested with the 2000 ppm data. FIG. 11 shows the output of computer 120. In FIG. 11, the actual fuel types for each waveform tested by computer 120 are identified across the top of the figure. For example, unleaded gasoline begins with approximately waveform number 18 and ends with waveform number 38. The fuel type selected by computer 120 for each waveform is identified along the y-axis of the figure. Specifically, for each waveform, computer 120 identifies the most likely fuel type based on the output of equation (4). In FIG. 11, the fuel type is designated with a solid circle along the horizontal line next to the identified fuel and above the waveform number. The most likely fuel type is determined from the coefficient c with the highest value. This determination was correct for all waveforms in this data set. The second highest value of c gives the second best guess and is plotted as an x. Ideally the vector c would contain only two nonzero elements describing the contributions of the background and a single fuel type. Hence, FIG. 11 should display a stair stepped series of solid circles with x's along the background. Deviations from this behavior indicate problems with the instrument sample, data acquisition protocol or code.

Figure 12:
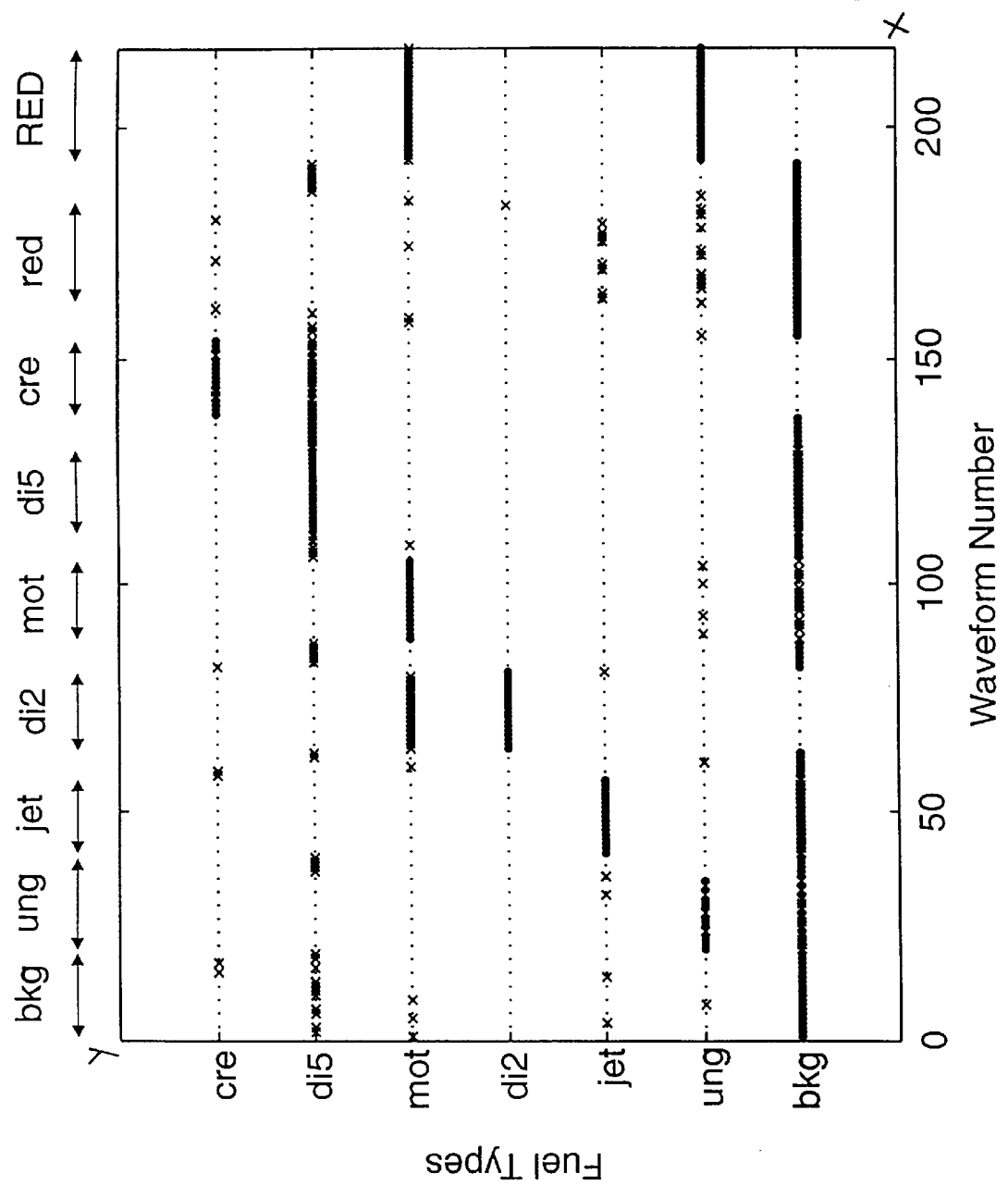
FIGS. 12 and 13 are further graphs that illustrate results of experiments with an embodiment of the present invention for identifying known fuel samples with a 300 ppm concentration.

FIG. 12 shows the results for the 300 ppm data set when the time shift previously mentioned is ignored. The assignments were almost always correct. However, unleaded gasoline was erroneously assigned as background a few times. This is not surprising given the low intensity signals and the variation in waveform with concentration for unleaded gasoline. Creosote was erroneously assigned as diesel #5 a few times. These errors are probably due to the similarity in their waveforms. The time shift between the 2000 and 300 ppm data sets also contributes to these errors. The 300 ppm reduced unleaded gasoline was consistently assigned as background. This is expected because the signal levels are only slightly above background. The second best guess was divided mainly between unleaded gasoline and jet fuel, thus making accurate assignment impossible. The 2000 ppm reduced unleaded gasoline was assigned as unleaded gasoline. Motor oil was the second best guess for this fuel type and indeed a sum of unleaded gasoline and motor oil waveforms does resemble the reduced unleaded gasoline waveform. It is noted that reduced unleaded gasoline was not included in the basis set. Notice that the second best guesses for diesel #2 and creosote were motor oil and diesel #5, respectively, not background as expected. The strong similarities in these waveforms could cause confusion or at least reduce confidence in the assignments. Even in light of these problems, these results indicate that this algorithm is capable of identifying fuel types.

Figure 13:
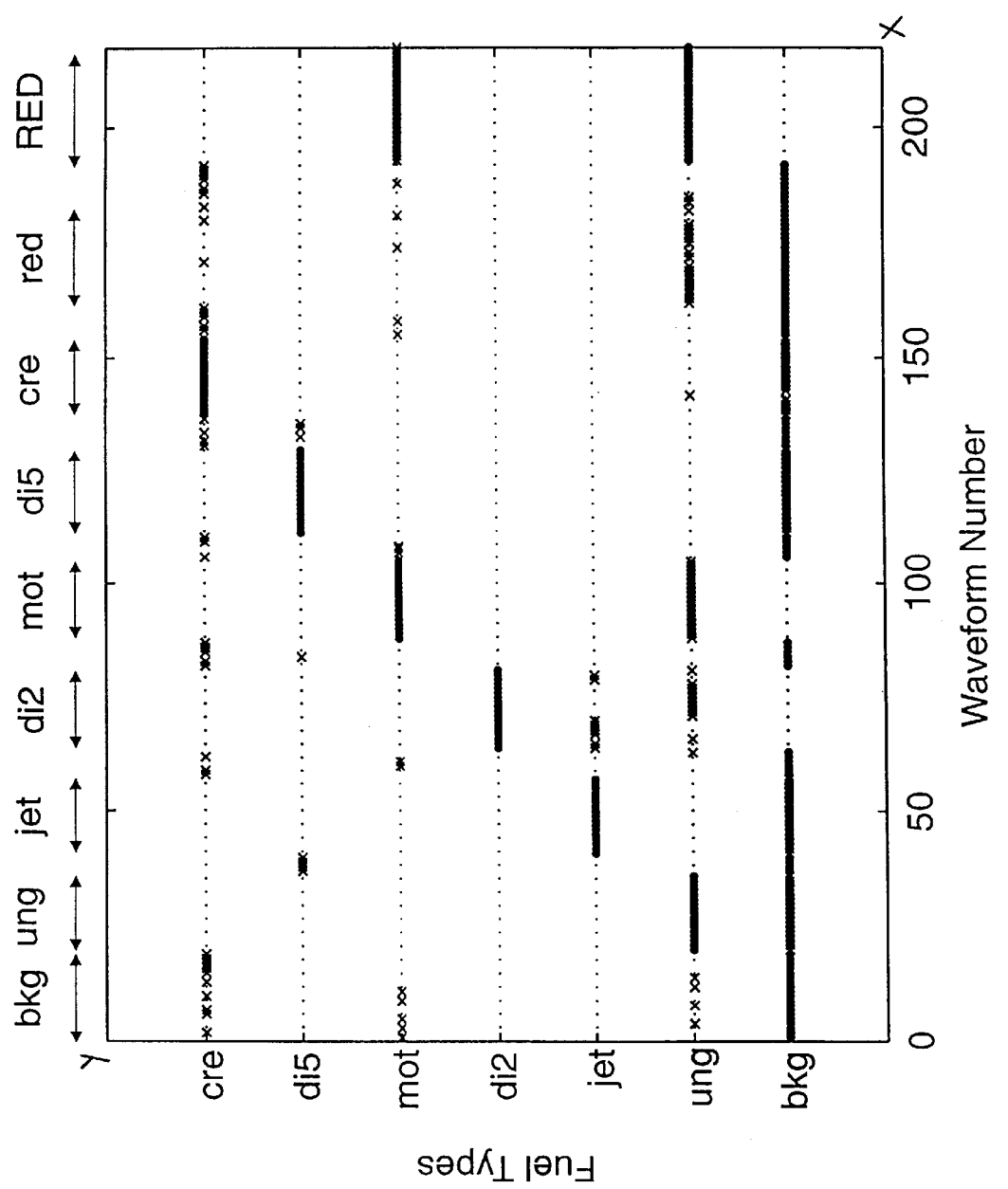

FIG. 13 shows the results for the time shift corrected 300 ppm data. The data were time shift "corrected" by eliminating two points (1 ns worth of data) from the data set. Except for 300 ppm reduced unleaded gasoline every primary assignment is correct. The secondary assignment for reduced unleaded gasoline is now mostly correct. The secondary assignments for diesel #2 and motor oil are mainly unleaded gasoline which far more closely resembles the background than the earlier assignments of motor oil and diesel #5. Presumably, a single profile with more averaging or a quick wavelength time matrix could quickly distinguish between an unleaded fuel contribution or a erroneous assignment. These results indicate the need to minimize any time shift between the basis set waveforms and the test data.

Figure 14:
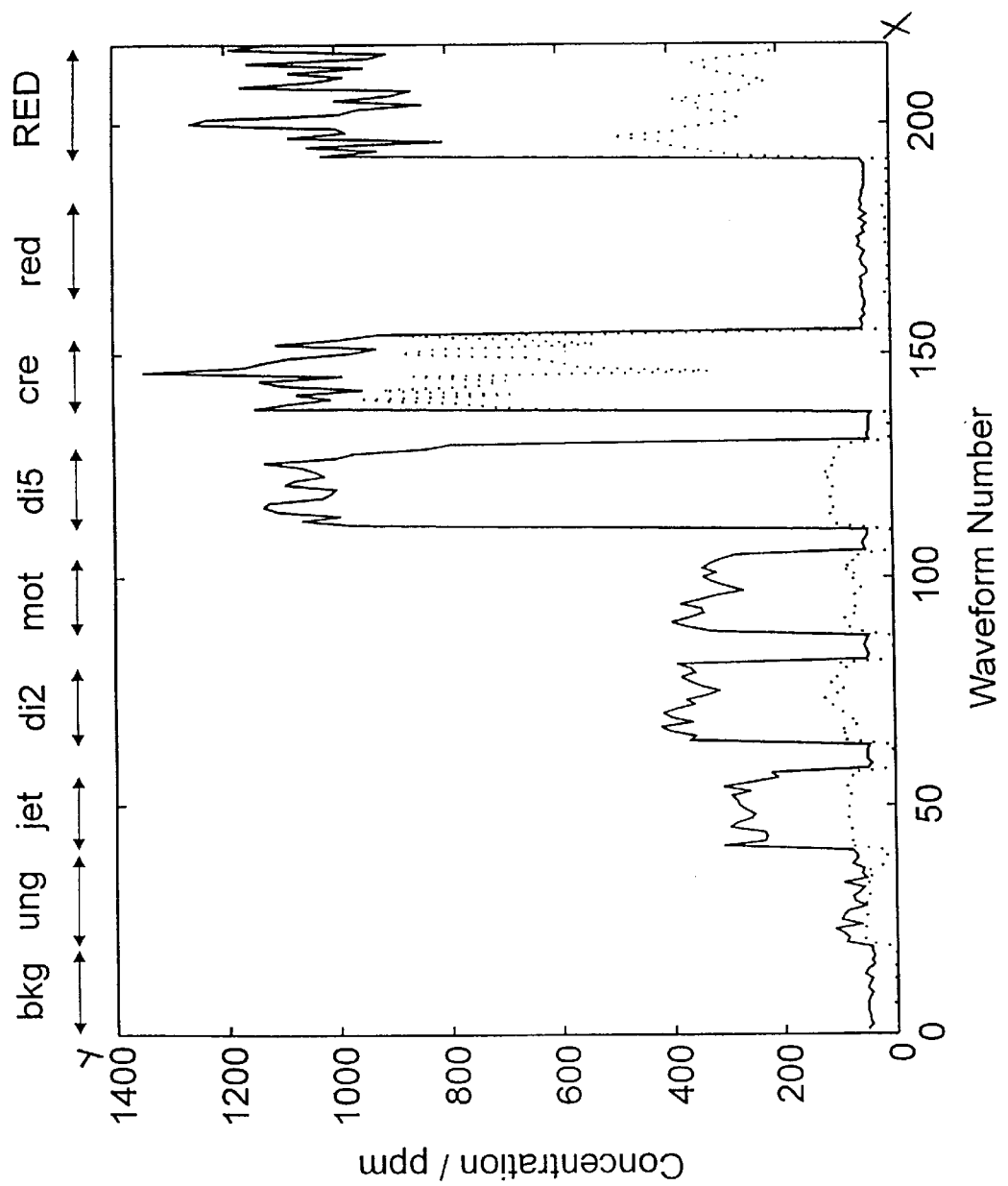
FIGS. 14 through 17 are graphs that illustrate concentrations and confidence indicators for chemicals detected with an embodiment of the present invention.
Figure 15:
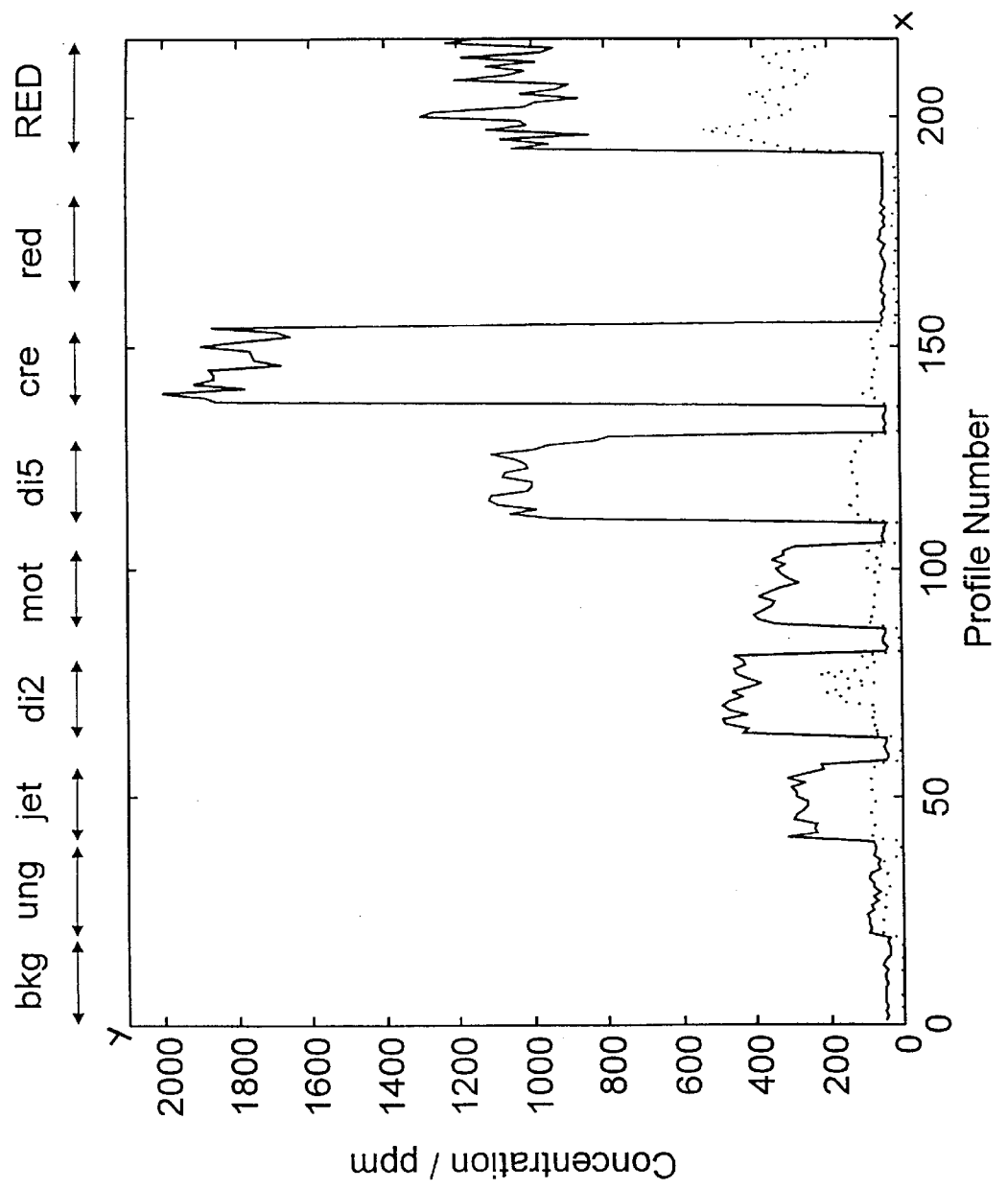

Having identified the fuel types, the fuel concentrations are now of interest. FIGS. 14 and 15 show the two largest values of c for each profile in the 300 ppm data set. Except for the regions of only background FIGS. 14 and 15 would ideally show all samples at a concentration of 300 ppm (RED would be near 2000 ppm). This desired result is roughly realized for jet fuel, diesel #2 and motor oil. All other fuel concentrations show considerable differences from 300 ppm. These deviations are most likely due to highly nonlinear intensity/concentration relationships for these fuels. Experimental errors are strongly suspected for the reduced unleaded gas sample and are possible for the unleaded gas sample. This concentration calculation presumes a linear intensity concentration relationship over the 300 to 2000 ppm range. An intensity vs concentration calibration curve for each fuel type could improve these results when a single fuel type dominates.

The creosote results in FIG. 14 have a large diesel #5 contribution. This was initially attributed to the similarities in their waveforms. However, FIG. 15 indicates this result is a consequence of the time shift. The motor oil contribution to the 2000 ppm reduced unleaded gasoline result is expected. Reduced unleaded gasoline is not in the basis set, hence a linear combination of unleaded gasoline and motor oil is the best match. Notice that even the sum of the calculated concentrations for RED do not approach the desired value of 2000 ppm.

A confidence indicator can be extracted from the relative size of the largest value of c. A perfect match of a waveform with any of the basis waveforms would give one nonzero value of c and all the rest as zero. Hence, a plot of the highest value of c divided by the sum of all values of c would be unity for a perfect assignment and would decrease as other components, e.g. background, must be added to improve the fit.

Figure 16:
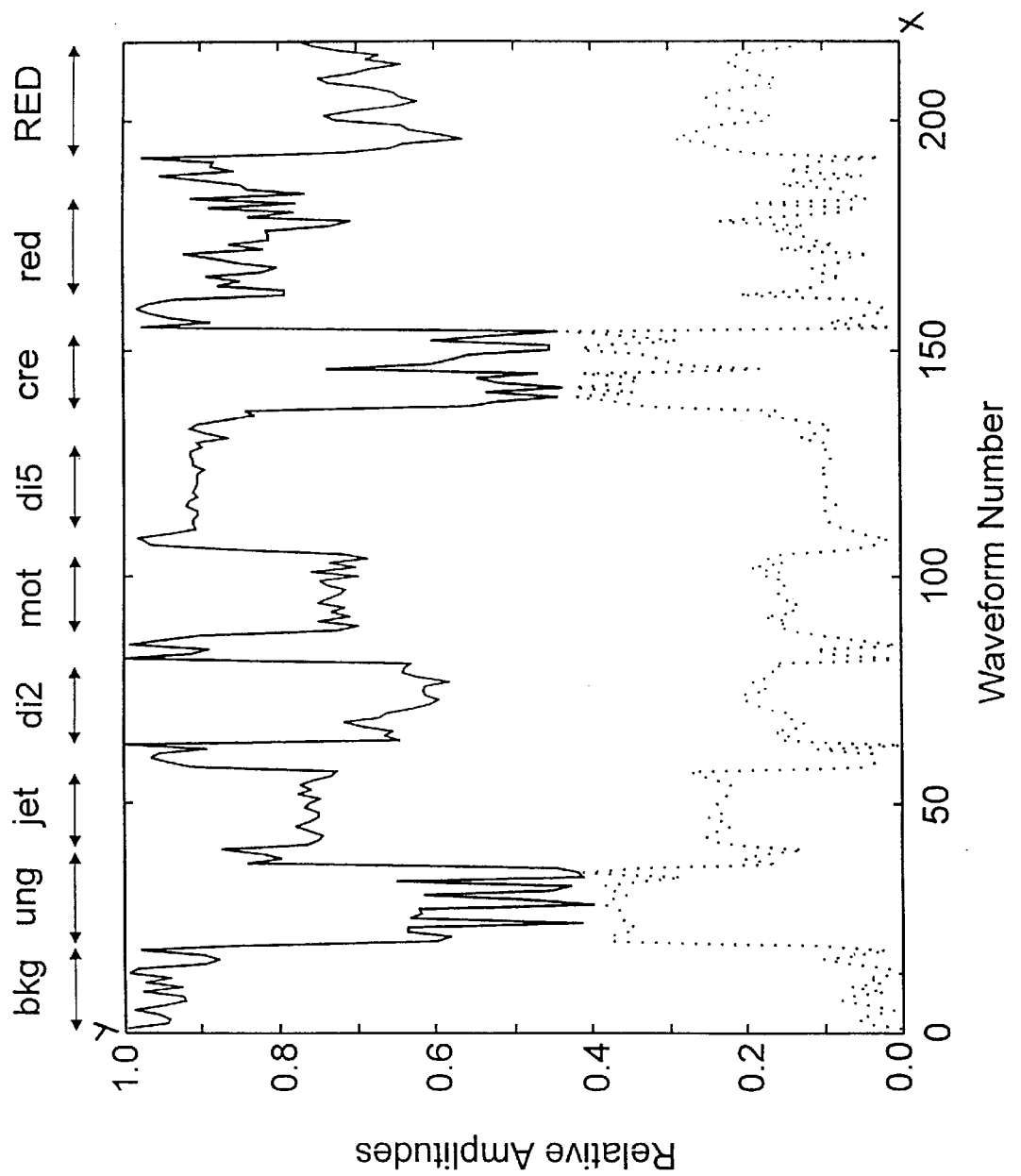
Figure 17:
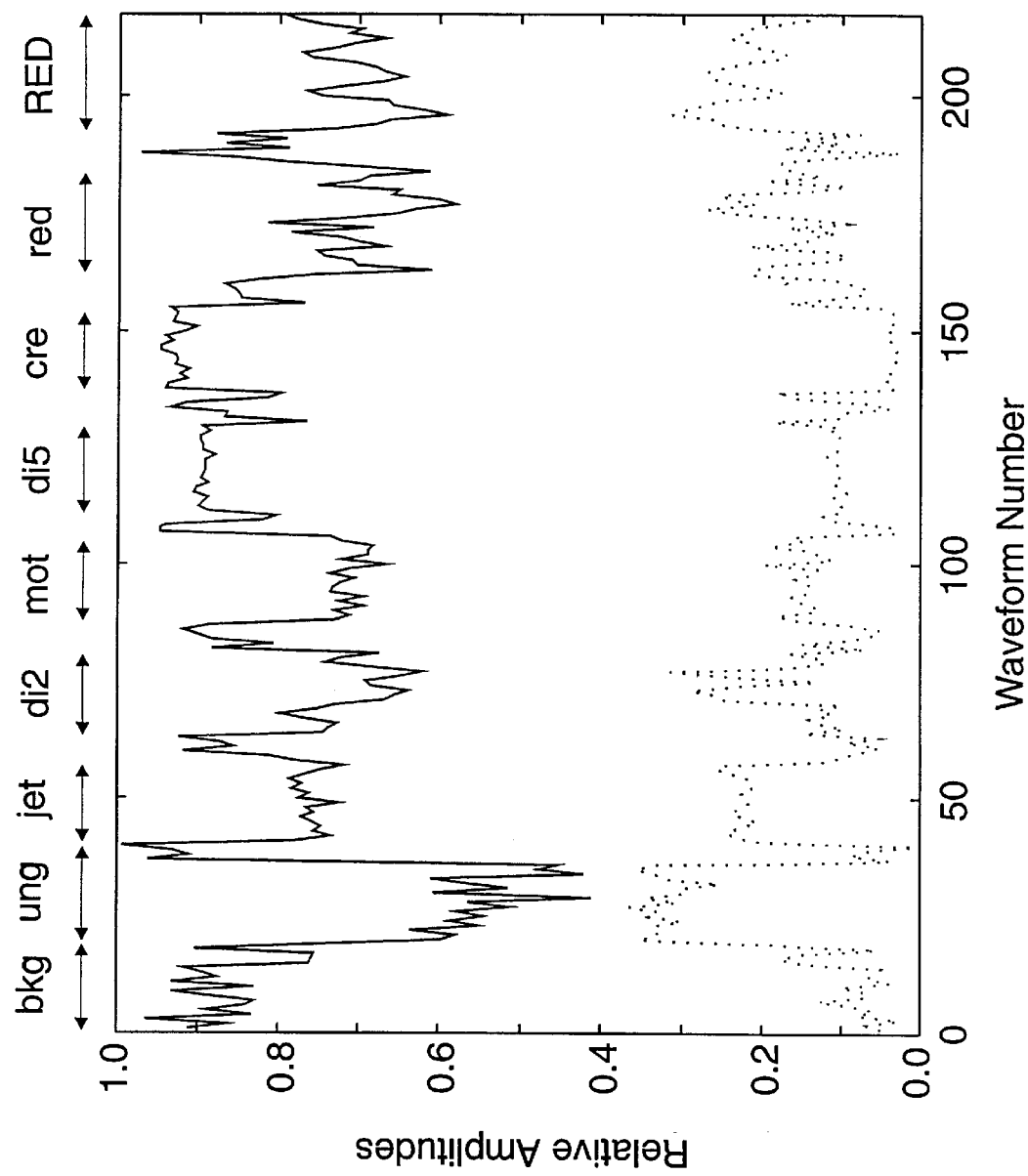

FIGS. 16 and 17 show the highest two coefficients divided by the sum of the coefficients for each waveform in the 300 ppm data set. The closer the solid line approaches unity the more confident the assignment should be. Unleaded gasoline and creosote have the lowest confidence indicators in FIG. 16. The confidence in the unleaded gasoline results are low because of the large contribution of the background. The creosote confidence indicator is affected by the time shift, see FIG. 17.

Figure 18:
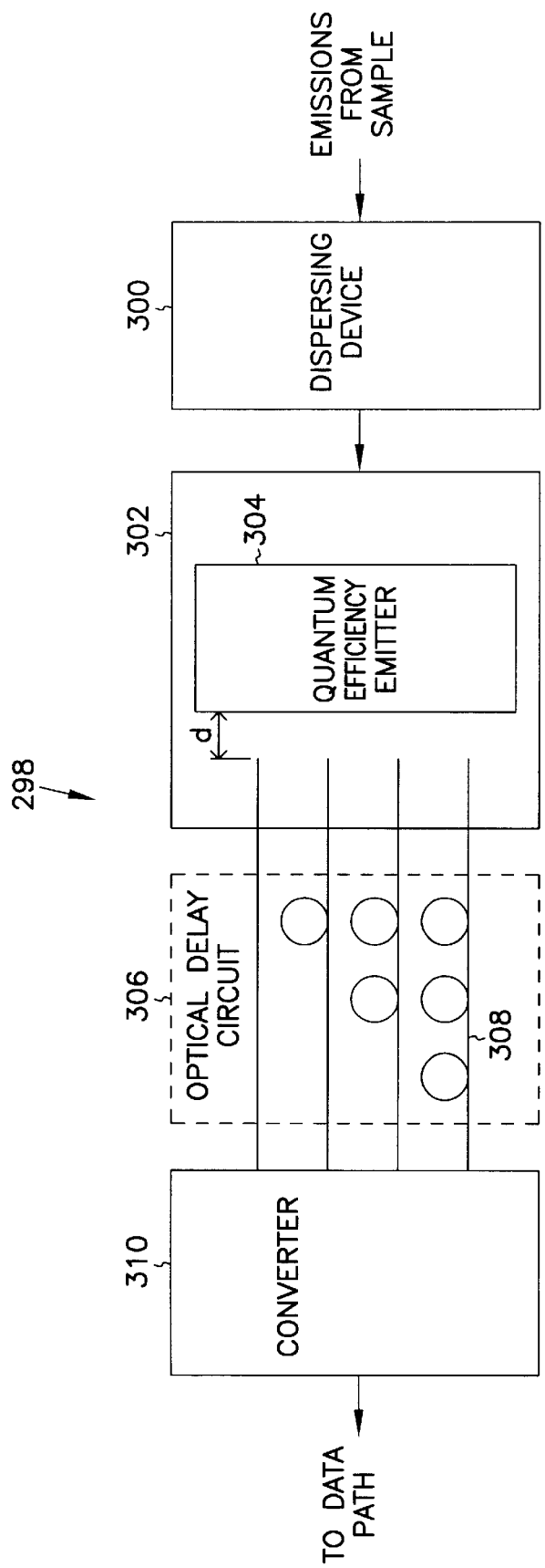
FIG. 18 is a schematic diagram of another embodiment of the present invention.

FIG. 18 shows another embodiment of the present invention. In the embodiment of FIG. 18, system 298 generates data from emissions from a substance under test. The emissions can be generated by the techniques shown and described above with respect to FIGS. 1 and 6. In this embodiment, system 298 includes frequency shifter 302 that shifts the optical signals from a first frequency range to a second frequency range. Advantageously, by shifting the optical signals to a lower frequency range, for example, less costly communications fiber can be used for fibers 308 in optical delay circuit 306. This can result in significant cost savings over more expensive fibers used to transmit optical signals in the frequency spectrum of emissions from chemical substances, such as fossil fuels.

Frequency shifter 302 includes a high quantum efficiency emitter 304 that produces the frequency shift in optical signals from dispersing device 300 (e.g., a spectrograph). Quantum efficiency emitter 304 is formed of a material that receives signals (photons) from dispersing device 300 in the range of 250 to 600 nm in wavelength and produces output signals (photons) with a wavelength in the range of 600 to 700 nm.

The bandwidth of the optical signals carried over fibers 308 to converter 310 can be varied by varying the distance between fiber 308 and quantum efficiency emitter 304. By moving the end of fiber 308 away from quantum efficiency emitter 304, the bandwidth of signals carried to converter 310 is increased.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the number of optical fibers in optical delay circuit 38a can be varied to meet the requirements of a specific application. Further, the length of the optical fibers can similarly be varied. In some embodiments, it is not necessary to include a spectrograph as an element of the system. Rather, the optical delay circuit can be positioned so as to receive electromagnetic emissions of an appropriate wavelength from test material. Further, embodiments of the present invention may be applied to delay and measure emissions from other sources such as an explosion or other appropriate pulsed event. Although the illustrative embodiments of the present invention described herein have been described in terms of luminescence spectroscopy, it should be understood that the teachings of the present invention can similarly be applied to a Raman spectrum, which can be defined as the relative intensity distribution of inelastically scattered light at a plurality of wavelengths.

What is claimed is:

1. A spectroscopic system that processes spatially dispersed electromagnetic emissions at a number of wavelengths from a test material, the system comprising:
    a converter that generates an electrical signal that is proportional to the intensity of the electromagnetic radiation received by the converter;
    an optical delay circuit coupled to an input of the converter that selectively delays application to the converter of the electromagnetic emissions from the test material for at least one wavelength of electromagnetic emissions;
    a data processing circuit coupled to an output of the converter that records the value of the electrical signal from the converter over time so as to measure, contemporaneously, the intensity of electromagnetic emissions at each wavelength as a function of time; and
    wherein the data processing circuit includes a computer that is programmed to extract signals that represent the electromagnetic emissions at different wavelengths that overlap in time at the converter.

2. The system of claim 1, wherein the optical delay circuit comprises a plurality of optical fibers having different lengths so as to selectively delay application of the electromagnetic emissions of different wavelengths to the converter.

3. The system of claim 1, and further comprising a spectrograph positioned to receive and disperse the electromagnetic emissions from the test material and apply the test material's emissions to the optical delay circuit.

4. The system of claim 1, wherein the converter comprises a photodiode.

5. The system of claim 1, wherein the converter comprises a photomultiplier.

6. The system of claim 1, wherein the data processing circuit comprises a digital oscilloscope.

7. The system of claim 1, and further comprising a frequency shifter coupled to the input of the optical delay circuit that shifts the frequency spectrum of the electromagnetic emissions.

8. The system of claim 1, and further comprising a laser to irradiate the test material with electromagnetic pulses.

9. The system of claim 8, wherein the laser produces pulses such that the time between pulses is at least as great as the delay introduced by the longest fiber optic line.

10. A spectroscopic system that processes electromagnetic emissions at a number of wavelengths from a test material, the system comprising:
    a radiation source;
    a probe that is optically coupled to the radiation source that delivers the radiation to the test material to generate the electromagnetic emissions;
    a converter that generates an electrical signal that is proportional to the intensity of electromagnetic radiation received by the converter;
    a plurality of optical fibers coupled to transmit the electromagnetic emissions with a plurality of wavelengths from the compounds to the converter, the fibers having different lengths so as to selectively delay application of the electromagnetic emissions at different wavelengths to the converter;
    a data processing circuit coupled to an output of the converter that records the value of the electrical signal from the converter over time so as to measure, contemporaneously, the intensity of electromagnetic emissions at each wavelength as a function of time; and
    wherein the data processing circuit includes a computer that is programmed to extract signals that represent the electromagnetic emissions at different wavelengths that overlap in time at the converter.

11. The system of claim 10, wherein the converter comprises a photodiode.

12. The system of claim 10, wherein the converter comprises a photomultiplier.

13. The system of claim 10, wherein the data processing circuit comprises a digital oscilloscope.

14. A spectroscopic method comprising the steps of:
    radiating an electromagnetic signal to excite emissions from a test material;
    transmitting the emissions with an optical delay circuit to a converter to convert the emissions to electrical signals, the optical delay circuit selectively delaying at least one wavelength of the emissions;
    recording the electrical signals over time to measure, contemporaneously, the intensity of emissions at each wavelength as a function of time; and removing overlap in time of the electrical signals that represent the intensity of the emissions.

15. The method of claim 14, wherein the step of radiating an electromagnetic signal comprises radiating electromagnetic pulses with a laser.

16. The method of claim 14, wherein the step of transmitting the emissions comprises the step of transmitting the emissions with a plurality of optical fibers that have different lengths so as to establish a delay for application of each wavelength to the converter.

17. A method of applying an optical signal to a converter, the method comprising the steps of:

delaying at least one wavelength of the optical signal relative to other wavelengths of the optical signal so that the wavelengths are applied to the converter at different times;

recording the output of the converter; and extracting the intensity of electromagnetic emissions at each wavelength as a function of time from the recorded output of the converter whereby overlap in time of the emissions is removed.

* * * * *